United States Patent
Shi et al.

(10) Patent No.: US 11,463,980 B2
(45) Date of Patent: Oct. 4, 2022

(54) METHODS AND APPARATUSES USING SENSING SYSTEM IN COOPERATION WITH WIRELESS COMMUNICATION SYSTEM

(71) Applicant: Huawei Technologies Co., Ltd., Shenzhen (CN)

(72) Inventors: Wuxian Shi, Ottawa (CA); Yiqun Ge, Ottawa (CA); Wen Tong, Ottawa (CA)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 16/795,137

(22) Filed: Feb. 19, 2020

(65) Prior Publication Data

US 2020/0275402 A1    Aug. 27, 2020

Related U.S. Application Data

(60) Provisional application No. 62/809,053, filed on Feb. 22, 2019.

(51) Int. Cl.
| | | |
|---|---|---|
| *H04W 64/00* | (2009.01) | |
| *H04W 16/28* | (2009.01) | |
| *H04W 76/11* | (2018.01) | |
| *H04W 4/02* | (2018.01) | |

(52) U.S. Cl.
CPC ......... *H04W 64/003* (2013.01); *H04W 4/025* (2013.01); *H04W 16/28* (2013.01); *H04W 76/11* (2018.02)

(58) Field of Classification Search
CPC .... H04W 64/003; H04W 76/11; H04W 16/28
See application file for complete search history.

(56) References Cited

U.S. PATENT DOCUMENTS

| | | | |
|---|---|---|---|
| 2011/0319106 A1 | 12/2011 | Lim et al. | |
| 2014/0168424 A1* | 6/2014 | Attar | H04N 5/247 348/140 |
| 2014/0316848 A1* | 10/2014 | Fuchs | G06Q 30/02 705/7.29 |
| 2014/0355535 A1 | 12/2014 | Cai et al. | |
| 2015/0109528 A1* | 4/2015 | Choi | H04N 5/145 348/460 |
| 2015/0195025 A1 | 7/2015 | Kang et al. | |
| 2016/0135132 A1* | 5/2016 | Donepudi | H04W 4/025 370/311 |
| 2016/0183275 A1* | 6/2016 | Inoue | H04B 7/0695 455/450 |

(Continued)

FOREIGN PATENT DOCUMENTS

| | | |
|---|---|---|
| CN | 104782158 A | 7/2015 |
| CN | 105379412 A | 3/2016 |

(Continued)

*Primary Examiner* — Barry W Taylor
(74) *Attorney, Agent, or Firm* — Slater Matsil, LLP

(57) ABSTRACT

Methods and systems are described which use a sensing system in cooperation with a wireless communication system. Coordinate information (which may be from the sensing system, from an electronic device, or from a network-side device) and signal-related information (which may be from the wireless system) are associated with each other. The associated information may be used for wireless communication management, such as beam management operations, among others.

21 Claims, 25 Drawing Sheets

(56) References Cited

U.S. PATENT DOCUMENTS

| | | | |
|---|---|---|---|
| 2017/0111845 A1* | 4/2017 | Ni | H04W 36/165 |
| 2018/0091202 A1* | 3/2018 | Azogui | H04W 40/14 |
| 2019/0120955 A1* | 4/2019 | Zhong | B60R 11/04 |
| 2019/0271767 A1* | 9/2019 | Keilaf | G01S 7/4815 |
| 2019/0364492 A1* | 11/2019 | Azizi | H04W 52/0264 |
| 2020/0092838 A1* | 3/2020 | Koo | H04W 64/003 |
| 2020/0163045 A1* | 5/2020 | Hamada | H04W 36/08 |
| 2020/0184718 A1* | 6/2020 | Chiu | G06K 9/6289 |
| 2020/0204237 A1* | 6/2020 | Zhou | H04B 7/0695 |
| 2020/0257306 A1* | 8/2020 | Nisenzon | G05D 1/0274 |
| 2021/0035422 A1* | 2/2021 | Sherman | H04R 1/406 |

FOREIGN PATENT DOCUMENTS

| | | |
|---|---|---|
| CN | 105453465 A | 3/2016 |
| CN | 106489286 A | 3/2017 |
| CN | 108370576 A | 8/2018 |
| WO | 2014149405 A2 | 9/2014 |

\* cited by examiner

Digital beamforming

Analog beamforming

LOS beam pair

NLOS beam pair

METHODS AND APPARATUSES USING SENSING SYSTEM IN COOPERATION WITH WIRELESS COMMUNICATION SYSTEM

CROSS-REFERENCE TO RELATED APPLICATIONS

The present disclosure claims priority from U.S. provisional patent application No. 62/809,053, filed Feb. 22, 2019, entitled "METHODS AND APPARATUSES USING SENSING SYSTEM IN COOPERATION WITH WIRELESS COMMUNICATION SYSTEM", the entirety of which is hereby incorporated by reference.

FIELD

The present disclosure is related to methods and apparatuses that use a sensing system in cooperation with a wireless communication system, for example to assist in beam management operations.

BACKGROUND

In a typical modern radio communication system such as wide band code division multiple access (WCDMA), long-term evolution (LTE), 5th Generation (5G), Wi-Fi and so on, a number of electronic devices (EDs) (which may also be referred to as clients, terminals, user equipment (UEs), moving station, etc.) may be connected to or associated with a base station (BS) (which may also be referred to as a base transceiver station (BTS), Node-B, eNodeB, gNB, access point (AP), transmission point (TP), etc.) over-the-air. Neither the EDs nor the BS have perfect knowledge of the spatial position (e.g., 3D coordinates and velocities) of the others. Through measurement information (e.g., signal strength, channel response, and channel quality, among other possibilities) and/or other feedback from EDs, a BS may approximate the position of the associated EDs. In practice, a BS having good knowledge about the positions or some aspect of the positions (e.g., the relative direction of an ED to a BS) of its associated EDs, especially moving ones, provides an overall benefit to the system by reducing the controlling and scheduling overhead.

Beamforming technology has been widely used in practice. A typical beamforming operation tunes an antenna array (also referred to as an antenna set or array antenna) to form a directed radio beam. For example, a transmitter may perform beamforming to concentrate the energy on the main lobe of a radio beam to direct the radio beam towards a target receiver. Similarly, a receiver performing beamforming can tune its own antenna array to direct the radio beam toward a target transmitter beam, in order to help lower the receiving sensitivity threshold. If one transmitter's beam points to a target receiver beam and the target receiver's beam points to the transmitter beam, a good quality link is established in such a way that a receiver can become transmitter and vice versa. This may be referred to as a beam pair.

In millimeter wave (mmWave) wireless communications (e.g., at about or above 28 GHz band), beam management may be challenging. One reason is because a mmWave radio beam typically is relatively narrow (e.g., may having a beam angle of about 2-7 degree), with the result that beam management in mmWave communications becomes sensitive to device mobility. As well, mmWave signals typically have poor penetration and diffraction abilities, and typically cannot be transmitted through a solid obstacle. Accordingly, it may be necessary to route an alternative beam due to a device moving behind an obstacle for example Accordingly, it would be desirable to provide a way to improve beam management for mobile devices, including for mmWave wireless communications.

SUMMARY

In some examples, the present disclosure describes a sensing system which may be used to aid the operation of a wireless telecommunication system. The sensing system may include a positional system that provides coordinate information.

Information derived from beam management interactions may help to associate the coordinate information from the positional system with device identifiers registered in the wireless system. In some examples, machine learning may be used.

In some examples, coordinate information of an ED, which may be provided by the ED or a network device such as the BS, may help to associate a sensed object from the positional system with device identifier(s) registered in the wireless system.

In various examples, the present disclosure describes the use of coordinate information from a positional system to assist in beam management for wireless communications in a wireless system. In some examples, machine learning may be used.

In various examples, the present disclosure describes methods and systems that may help to determine a 3D position of an ED, and may assist in beamforming with little or no overhead for wireless communications.

The examples disclosed herein may help to improve resource management efficiency, including for mmWave wireless communications. Communications in other radio bands (e.g., sub-6 GHz communications) may also benefit from some of the disclosed examples.

The examples disclosed herein may enable collection of useful information about positions, movements and/or wireless traffics of EDs.

In some examples, the sensing system described herein may be used to monitor for the occurrence of certain events at EDs and/or in the environment. The sensing system may use the wireless system to generate notifications of such events.

In some examples, the positional system (which may be part of the sensing system) described herein may be used to perform analysis on collected information, and may generate requests to various sensors to collect desired information (e.g., based on a request from a third party or based on a request from an entity that is part of the sensing system and/or wireless system).

In some examples, coordinate information related to the position of an ED may be obtained from the ED itself, or from the associated BS (or other network-side device). In some examples, a signal-related map may be generated or updated, based on the obtained coordinate information. The signal-related map may enable prediction of useful wireless communication parameters based on a predicted or expected future coordinate position of an ED.

In some examples, the present disclosure describes a method including: obtaining a set of coordinate information representing a spatial location of an electronic device (ED); obtaining a set of signal-related information related to wireless signaling from the ED; generating a set of associated information for associating the set of coordinate information with the set of signal-related information; and providing the set of associated information for performing wireless communication management.

In some examples, the present disclosure describes a system including: a memory storing machine-executable instructions; and a processing unit coupled to the memory, the processing unit configured to execute the instructions to cause the system to: obtain a set of coordinate information representing a spatial location of an electronic device (ED); obtain a set of signal-related information related to wireless signaling from the ED; generate a set of associated information for associating the set of coordinate information with the set of signal-related information; and provide the set of associated information for performing wireless communication management.

In some examples, the present disclosure describes a computer-readable medium having encoded thereon machine-executable instructions, wherein the instructions, when executed by a processing unit of a system, cause the system to: obtain a set of coordinate information representing a spatial location of an electronic device (ED); obtain a set of signal-related information related to wireless signaling from the ED; generate a set of associated information for associating the set of coordinate information with the set of signal-related information; and provide the set of associated information for performing wireless communication management.

In some examples, generating the set of associated information may include: obtaining a signal-related map associated with the set of signal-related information; and generating an updated signal-related map based on the obtained signal-related map and the obtained set of coordinate information.

In some examples, generating the set of associated information may further include: associating the obtained coordinate information with the obtained set of signal-related information.

In some examples, the obtained signal-related map may be determined based on the ED being stationary.

In some examples, the updated signal-related map may be generated based on the ED being non-stationary.

In some examples, the updated signal-related map may include a predicted coordinate position of the non-stationary ED.

In some examples, the signal-related information may include one or more of: a UE-ID of the ED; a channel condition measured by the ED; a transmitter beam angle; a receiver beam angle; or a beam power.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
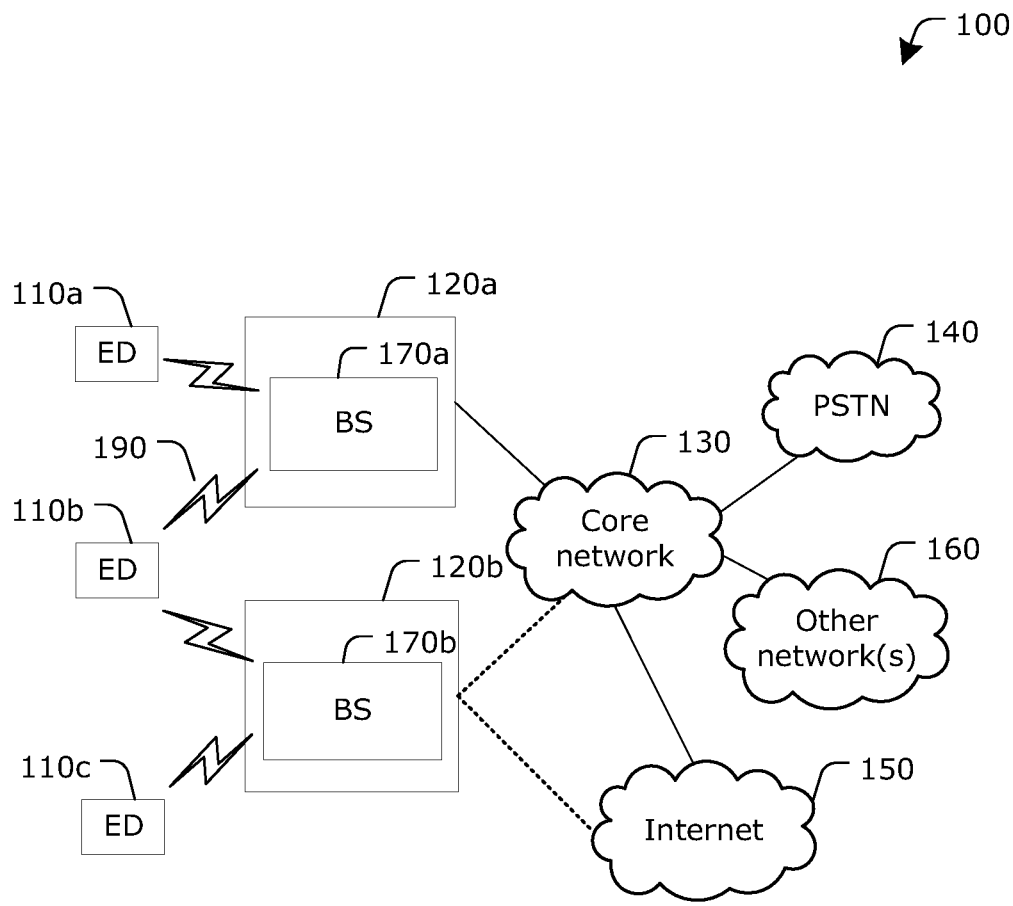
FIG. 1 is a schematic diagram of an example communication system suitable for implementing examples described herein.

FIG. 1 illustrates an example wireless communication system 100 (also referred to as wireless system 100) in which embodiments of the present disclosure could be implemented. In general, the wireless system 100 enables multiple wireless or wired elements to communicate data and other content. The wireless system 100 may enable content (e.g., voice, data, video, text, etc.) to be communicated (e.g., via broadcast, narrowcast, user device to user device, etc.) among entities of the system 100. The wireless system 100 may operate by sharing resources such as bandwidth.

In this example, the wireless system 100 includes electronic devices (ED) 110*a*-110*c* (generically referred to as ED 110), radio access networks (RANs) 120*a*-120*b* (generically referred to as RAN 120), a core network 130, a public switched telephone network (PSTN) 140, the internet 150, and other networks 160. Although certain numbers of these components or elements are shown in FIG. 1, any reasonable number of these components or elements may be included in the wireless system 100.

The EDs 110 are configured to operate, communicate, or both, in the wireless system 100. For example, the EDs 110 are configured to transmit, receive, or both via wireless or wired communication channels. Each ED 110 represents any suitable end user device for wireless operation and may include such devices (or may be referred to) as a user equipment/device (UE), a wireless transmit/receive unit (WTRU), a mobile station, a fixed or mobile subscriber unit, a cellular telephone, a station (STA), a machine type communication (MTC) device, a personal digital assistant (PDA), a smartphone, a laptop, a computer, a tablet, a wireless sensor, or a consumer electronics device, among other possibilities.

Each of the EDs 110 is configured with a respective unique identifier (ID), such as an identification number, which is unique to the ED 110 in the wireless system 100. The unique ID of the ED 110 may be generically referred to as device ID or ED ID. For example, the unique ID of the ED 110 may be an international mobile subscriber identity (IMSI), a permanent equipment identifier (PEI), a subscription permanent identifier (SUPI) or any other suitable identifier that may be used as a unique device ID.

In FIG. 1, the RANs 120 include base stations (BSs) 170*a*-170*b* (generically referred to as BS 170), respectively. Each BS 170 is configured to wirelessly interface with one or more of the EDs 110 to enable access to any other BS 170, the core network 130, the PSTN 140, the internet 150, and/or the other networks 160. For example, the BS 170*s* may include (or be) one or more of several well-known devices, such as a base transceiver station (BTS), a radio base station, a Node-B (NodeB), an evolved NodeB (eNodeB), a Home eNodeB, a gNodeB (sometimes called a "gigabit" Node B), a transmission point (TP), a transmit and receive point (TRP), a site controller, an access point (AP), or a wireless router, among other possibilities. Any ED 110 may be alternatively or additionally configured to interface, access, or communicate with any other BS 170, the internet 150, the core network 130, the PSTN 140, the other networks 160, or any combination of the preceding. The wireless system 100 may include RANs, such as RAN 120*b*, wherein the corresponding BS 170*b* accesses the core network 130 via the internet 150, as shown.

The EDs 110 and BSs 170 are examples of communication equipment that can be configured to implement some or all of the functionality and/or embodiments described herein. In the embodiment shown in FIG. 1, the BS 170*a* forms part of the RAN 120*a*, which may include other BSs, base station controller(s) (BSC), radio network controller(s) (RNC), relay nodes, elements, and/or devices. Any BS 170 may be a single element, as shown, or multiple elements, distributed in the corresponding RAN, or otherwise. Also, the BS 170*b* forms part of the RAN 120*b*, which may include other BSs, elements, and/or devices. Each BS 170 transmits and/or receives wireless signals within a particular geographic region or area, sometimes referred to as a "cell" or "coverage area". A cell may be further divided into cell sectors, and a BS 170 may, for example, employ multiple transceivers to provide service to multiple sectors. In some embodiments there may be established pico or femto cells where the radio access technology supports such. A macro cell may encompass one or more smaller cells. In some embodiments, multiple transceivers could be used for each cell, for example using multiple-input multiple-output (MIMO) technology. The number of RANs 120 shown is exemplary only. Any number of RANs may be contemplated when devising the wireless system 100.

The BSs 170 communicate with one or more of the EDs 110 over one or more air interfaces 190 using wireless communication links (e.g. radio frequency (RF), microwave, infrared (IR), etc.). The air interfaces 190 may utilize any suitable radio access technology. For example, the wireless system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A BS 170 may implement Universal Mobile Telecommunication System (UMTS) Terrestrial Radio Access (UTRA) to establish an air interface 190 using wideband CDMA (WCDMA). In doing so, the BS 170 may implement protocols such as high speed packet access (HSPA), HSPA+ optionally including high speed downlink packet access (HSDPA), high speed uplink packet access (HSUPA) or both. Alternatively, BS 170 may establish an air interface 190 with Evolved UTMS Terrestrial Radio Access (E-UTRA) using LTE, LTE-A, and/or LTE-B. It is contemplated that the wireless system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120 are in communication with the core network 130 to provide the EDs 110 with various services such as voice, data, and other services. The RANs 120 and/or the core network 130 may be in direct or indirect communication with one or more other RANs (not shown), which may or may not be directly served by core network 130, and may or may not employ the same radio access technology as RAN 120*a*, RAN 120*b* or both. The core network 130 may also serve as a gateway access between (i) the RANs 120 or EDs 110 or both, and (ii) other networks (such as the PSTN 140, the internet 150, and the other networks 160). In addition, some or all of the EDs 110 may include functionality for communicating with different wireless networks over different wireless links using different wireless technologies and/or protocols. Instead of wireless communication (or in addition thereto), the EDs 110 may communicate via wired communication channels to a service provider or switch (not shown), and to the internet 150. PSTN 140 may include circuit switched telephone networks for providing plain old telephone service (POTS). Internet 150 may include a network of computers and subnets (intranets) or both, and incorporate protocols, such as Internet Protocol (IP), Transmission Control Protocol (TCP), User Datagram Protocol (UDP). EDs 110 may be multimode devices capable of operation according to multiple radio access technologies, and incorporate multiple transceivers necessary to support such.

In the present disclosure, the term "network-side" does not necessarily refer to a specific network (such as the core network 130, PSTN 140, Internet 150 or other network(s) 160), but may instead be used to refer to components of the wireless system 100 excluding the ED 110. Thus, in the present disclosure, the components of the wireless system 100 excluding the ED 110 may be referred to as network-side devices (or network-side components).

Figure 2:
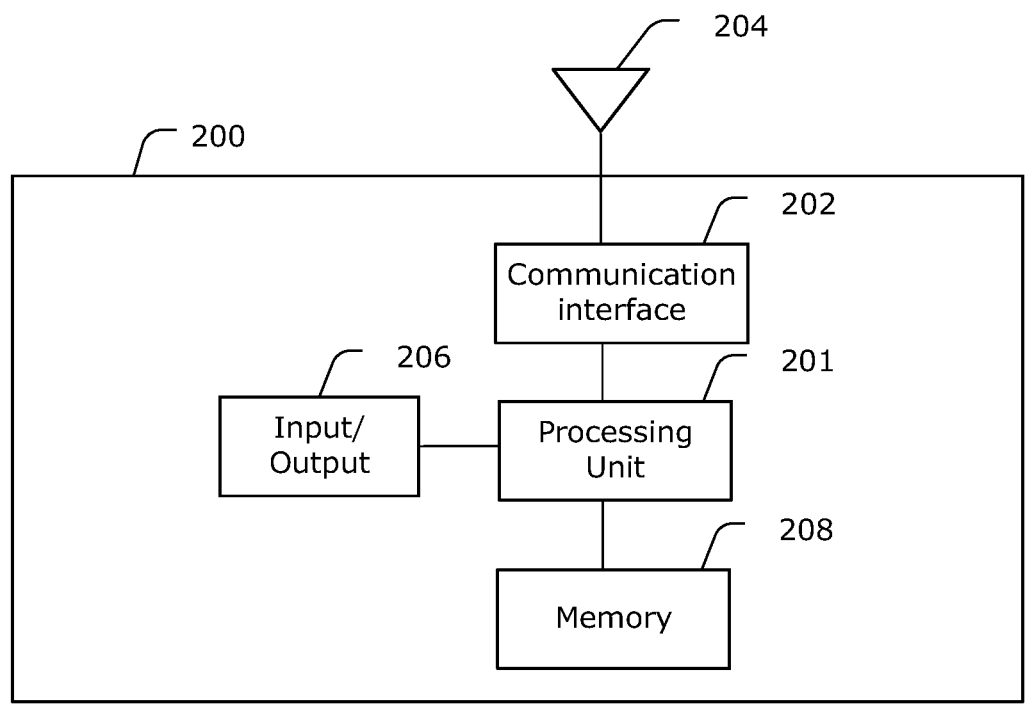
FIGS. 2 and 3 are block diagrams showing an example computing unit and an example base station, respectively, suitable for implementing examples described herein.
Figure 3:
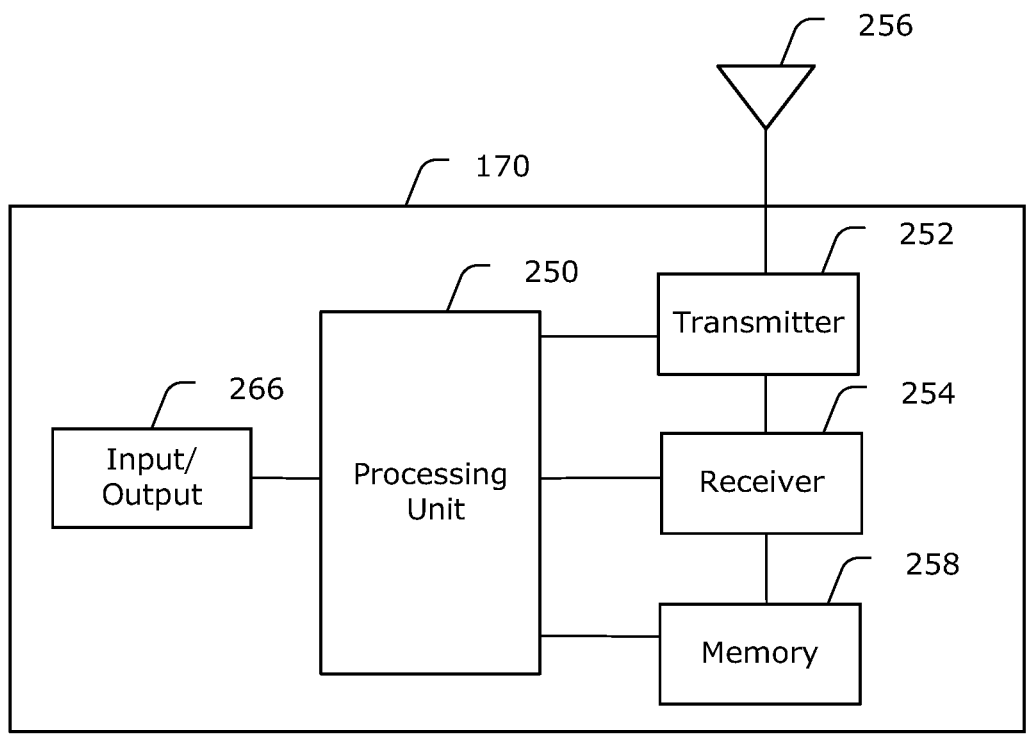

FIGS. 2 and 3 illustrate example devices that may implement the methods and teachings according to this disclosure. In particular, FIG. 2 illustrates an example computing unit (e.g., server or data center) 200, and FIG. 3 illustrates an example base station 170. These components could be used in the wireless system 100 or in any other suitable system (e.g., positional system and/or association system, discussed further below).

As shown in FIG. 2, the computing unit 200 includes at least one processing unit 201. The processing unit 201 implements various processing operations of the computing unit 200. For example, the processing unit 201 could perform signal coding, data processing, power control, input/output processing, or any other functionality of the computing unit 200. The processing unit 201 may also be configured to implement some or all of the functionality and/or embodiments described in more detail herein. Each processing unit 201 includes any suitable processing or computing device configured to perform one or more operations. Each processing unit 201 could, for example, include a microprocessor, microcontroller, digital signal processor, field programmable gate array, or application specific integrated circuit.

The computing unit 200 also includes at least one communication interface 202 for wired and/or wireless communications. Each communication interface 202 includes any suitable structure for generating signals for wireless or wired transmission and/or processing signals received wirelessly or by wire. The computer unit 200 in this example includes at least one antenna 204 (in other examples, the antenna 204 may be omitted). Each antenna 204 includes any suitable structure for transmitting and/or receiving wireless or wired signals. One or multiple communication interfaces 202 could be used in the computing unit 200. One or multiple antennas 204 could be used in the computing unit 200. In some examples, one or more antennas 204 may be an antenna array 204, which may be used to perform beamforming and beam steering operations. Although shown as a single functional unit, a computing unit 200 could also be implemented using at least one transmitter interface and at least one separate receiver interface.

The computing unit 200 further includes one or more input/output devices 206 or input/output interfaces (such as a wired interface to the internet 150). The input/output device(s) 206 permit interaction with a user or other devices in the network. Each input/output device 206 includes any suitable structure for providing information to or receiving information from a user, such as a speaker, microphone, keypad, keyboard, display, or touchscreen, including network interface communications.

In addition, the computing unit 200 includes at least one memory 208. The memory 208 stores instructions and data used, generated, or collected by the computing unit 200. For example, the memory 208 could store software instructions or modules configured to implement some or all of the functionality and/or embodiments described herein and that are executed by the processing unit(s) 201. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 3, the base station 170 includes at least one processing unit 250, at least one transmitter 252, at least one receiver 254, one or more antennas 256, at least one memory 258, and one or more input/output devices or interfaces 266. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described herein. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless or wired transmission to one or more EDs 110 or other devices. Each receiver 254 includes any suitable structure for processing signals received wirelessly or by wire from one or more EDs 110 or other devices. Although shown as separate components, at least one transmitter 252 and at least one receiver 254 could be combined into a transceiver. Each antenna 256 includes any suitable structure for transmitting and/or receiving wireless or wired signals. Although a common antenna 256 is shown here as being coupled to both the transmitter 252 and the receiver 254, one or more antennas 256 could be coupled to the transmitter(s) 252, and one or more separate antennas 256 could be coupled to the receiver(s) 254. In some examples, one or more antennas 256 may be an antenna array, which may be used for beamforming and beam steering operations. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described herein and that are executed by the processing unit(s) 250.

Each input/output device/interface 266 permits interaction with a user or other devices in the network. Each input/output device/interface 266 includes any suitable structure for providing information to or receiving/providing information from a user, including network interface communications.

Reference is again made to FIG. 1. In an example where the EDs 110 have mobility, information about the spatial position (e.g., based on which beam direction or which cell is used to provide coverage for each ED 110) of the EDs 110 may help a BS 170 to manage channel control and scheduling with the associated EDs 110.

In order for the BS 170 to determine the position of associated EDs, conventionally the BS 170 broadcasts downlink (DL) reference signals, such as a beacon signal in LTE, or a synchronization signal (SS) in 5G New Radio (NR). EDs 110 periodically measure the DL signal quality over these reference signals and report the measurement back to the BS(s) in an uplink (UL) signal. In some examples, an ED 110 may measure DL signal qualities from more than one BS 170. These measurements may be used to help the ED 110 to select a camping cell, and the measurements may also be used to help the core network 130 to position this ED 110. In another example, an ED 110 that is actively transceiving data may measure the channel quality on pilot reference signals, such as demodulation reference signal (DMRS) or channel state information-reference signal (CSI-RS) in LTE and 5G NR, and then report those measurements back to the BS 170 in an UL transmission.

Generally, such measurement and feedback are required for many wireless system operations such as resource allocation, handover management, beam management, and mobility management, among others. Beam management, in particular, is important in beamforming technology.

Figure 4:
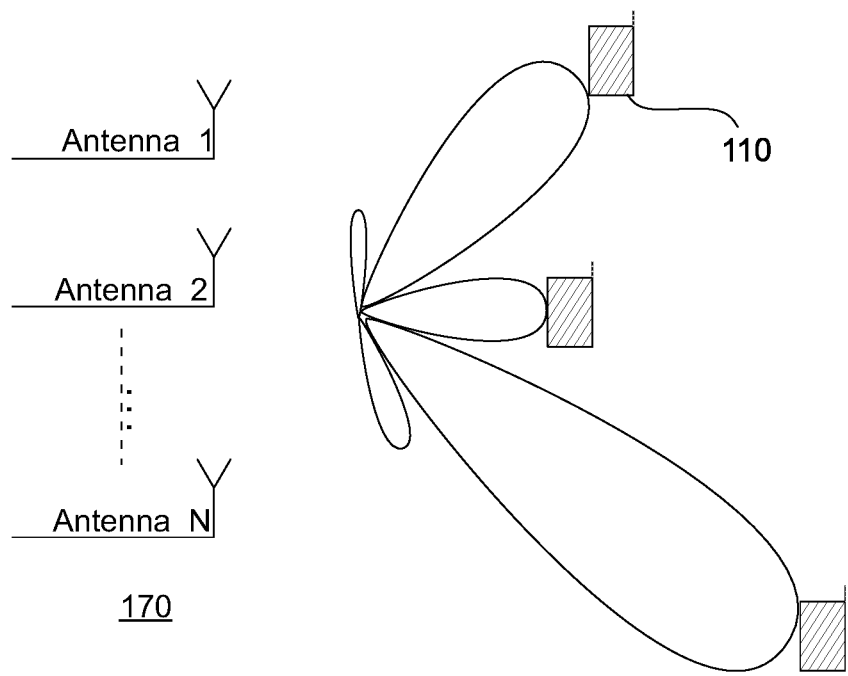
FIG. 4 illustrates some differences between digital beamforming and analog beamforming.
Figure 4:
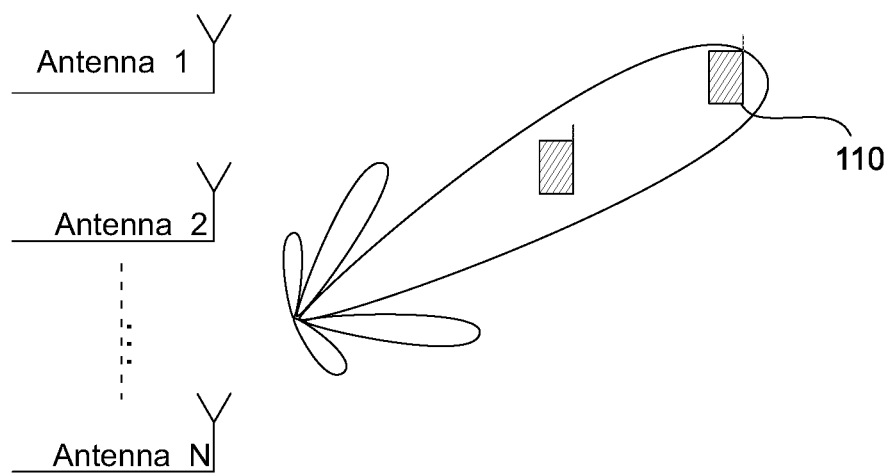

Antenna beamforming is a technology in which data is transmitted via radio beams generated using an antenna array. There are a number of individual antennas (also referred to as radiating elements or antenna elements) in the antenna array (also referred to as antenna set or array antenna). The direction of the beam generated by an antenna array may be changed by altering the phase and amplitude of the signals applied to each antenna in the array. Digital beamforming operations or analog beamforming operations may be used, as shown in FIG. 4. In digital beamforming (example illustrated in top portion of FIG. 4), different data stream may be transmitted using different antennas; multiple beams with different power and pointing different direction may be used. Digital beamforming may be used to enable Space Division Multiple Access (SDMA) or MIMO technology, for example. In analog beamforming (example illustrated in bottom portion of FIG. 4), the same data stream is transmitted using all the antennas in the antenna array; different beamforming weights (phase and amplitude) are applied to the antennas in the antenna array, to form a beam typically with one dominant main lobe. Analog beamforming is typically less complicated and more cost-effective compared to digital beamforming. However, analog beamforming typically transmits only one data stream and generates a single beam at a time. Thus, using analog beamforming, DL transmissions to different EDs 110 located in different directions are typically carried out in time separation. Similarly, the receiver beams typically only focuses in one direction at a time.

Millimeter wave (mmWave) frequencies often refer to a frequency range in the range of about 30 GHz to about 300 GHz, in which the wavelength is between about 10 mm to about 1 mm. Slightly lower frequencies, such as 28 GHz, may also be considered to be part of the mmWave band even though the wavelengths for such frequencies are longer than 10 mm.

Figure 5:
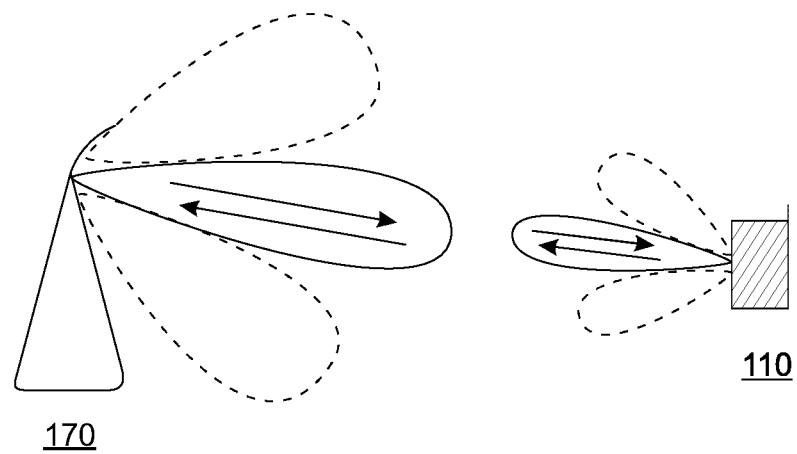
FIG. 5 illustrates some differences between line-of-sight beam pairs and non-line-of-sight beam pairs.
Figure 5:
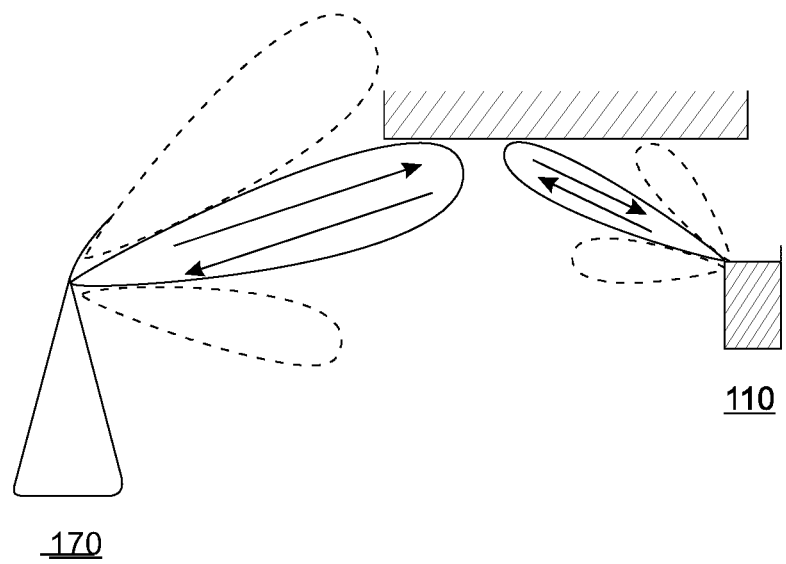

Wireless communications using such high frequencies have been found to have certain characteristics. Typically, mmWave communications provide more bandwidth to be used in wireless communication, which may result in higher system throughput. mmWave communications may enable more efficient frequency reuse (e.g., due to higher propagation loss). The propagation loss in mmWave communications is typically more severe than communications using sub-6 GHz bands. This may mean that mmWave is more suitable for small cell (e.g., cells of less than about 300 m in diameter) communications. Beamforming techniques may be used to save power in mmWave communications.

mmWave communications may make use of a larger number of antennas in the antenna array, to generate a narrower radio beam. Generally, directivity of a beamforming technology is a function of the number of antennas in the antenna array. The more antennas in the antenna array, the more directivity a radio beam can achieve. The minimal size of an antenna is typically determined by wavelength, which is a reciprocal of carrier frequency. For example, the carrier at sub-6 GHz bands (e.g., for 2G, 3G, 4G, or 5G sub-6 GHz wireless communications) typically requires a relatively large antenna, which can limit the total number of antennas in a practical beamforming antenna array. For high frequencies (e.g., a carrier around 30 GHz to 300 GHz), the wavelength may be on the order of cm~mm, which helps to reduce the minimal antenna size. This may enables a beamforming antenna array to be practically implemented with a higher number of antennas, in order to enhance beam directivity. This may be the case for 5G NR wireless communications, which uses about 28 GHz as the carrier frequency band (also referred to as mmWave band) and about 50 GHz as unlicensed bands.

mmWave communications typically has low diffraction ability. A radio path in mmWave may be easily blocked by certain kinds of solid object (e.g., car, building, human, etc.), so mmWave communications may conventionally rely on line-of-sight (LOS) connections. A mmWave radio path may have good reflection over some reflective bodies (e.g., metal surface) which may enable the use of non-LOS (NLOS) radio paths.

mmWave communications typically make use of beam pairs. In a beam pair, the transmitter beam direction and the receiver beam direction may jointly provide good connectivity. The transmitter and receiver beams in a beam pair may be directly pointing to each other (in a LOS condition, illustrated on left side of FIG. 5) or may be coupled via through a reflected path (in a NLOS condition, illustrated on right side of FIG. 5). The beam pair may be considered as a radio path connecting the transmitter and receiver, and may be used for both DL and UL, time division duplex (TDD) or frequency division duplex (FDD) transmission. In some conditions, an established beam pair may become outdated suddenly (e.g., due to a blockage of the radio path by a moving obstacle) and there may be insufficient time for regular beam adjustment to take place. The path connection between the BS and ED may be lost, thus triggering a reestablish request for the beam pair. This procedure may be referred to as beam recovery, and sometimes is similar to initial beam establishment.

Figure 6:
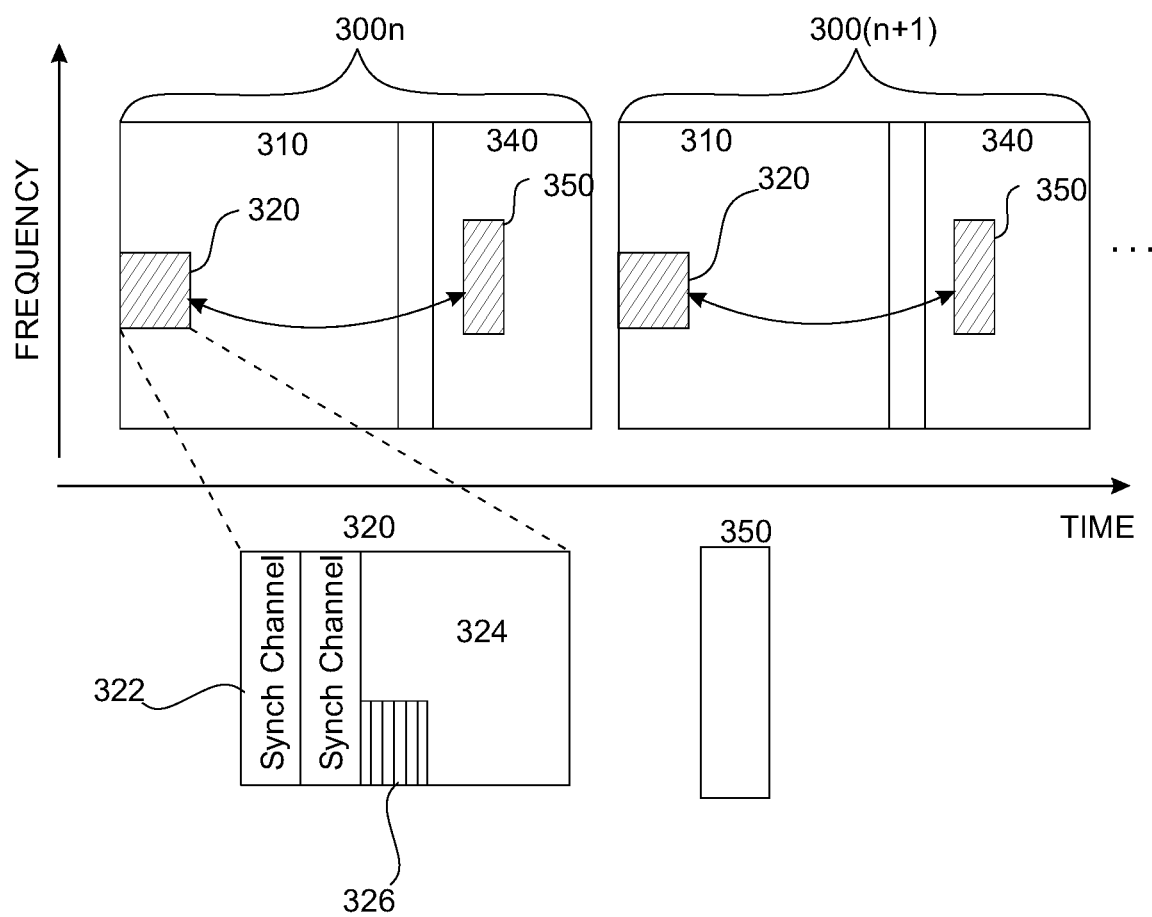
FIG. 6 is illustrates an example set of communications used for establishing a beam pair.

Generally, it may be desirable for the wireless system to maintain a beam pair. This may be referred to as beam management. For effective beam management, spatial position information about EDs 110 is required. This may be challenging, such as when the EDs 110 have high mobility and/or when more narrow beam direction is used. The conventional approach relies on the BS 170 sending reference signals DL and the ED 110 responding with UL feedback. FIG. 6 shows an example beamforming transmission frame structure. For example, radio frame 300$n$ and 300($n$+1) (generally referred to as radio frame 300) are shown. The radio frame 300 includes a DL frame 310 and an UL frame 340. The DL frame 310 carries a synchronization signal frame (SSF) 320, which includes synchronization channel(s) 322 and physical broadcast channel(s) (PBCH) 324. The PBCH 324 carries a synchronization signal block index (SSBI) 326. The UL frame 340 carries a random access channel (RACH) 350. As indicated by curved arrows, the SSF 320 sent by the BS 170 in the DL frame 310 of a given radio frame 300 is reported back to the BS 170 in the RACH 350. In an example operation, the ED 110, upon detecting the SSF 320 from the BS 170, performs the operations: synchronize on synchronization channel(s) 322; decode PBCH(s) 324; obtain position(s) of the DL control channels in the DL frame 310; decode DL control channel to obtain position of UL RACH 350 in the UL frame 340. The ED 110 then competes (with other EDs 110) for the UL RACH 350 by: generating RACH signal using its own device ID; transmitting the RACH signal on the UL RACH 350. The UL signal from the successful competing ED 110 is received by the BS 170.

Figure 7:
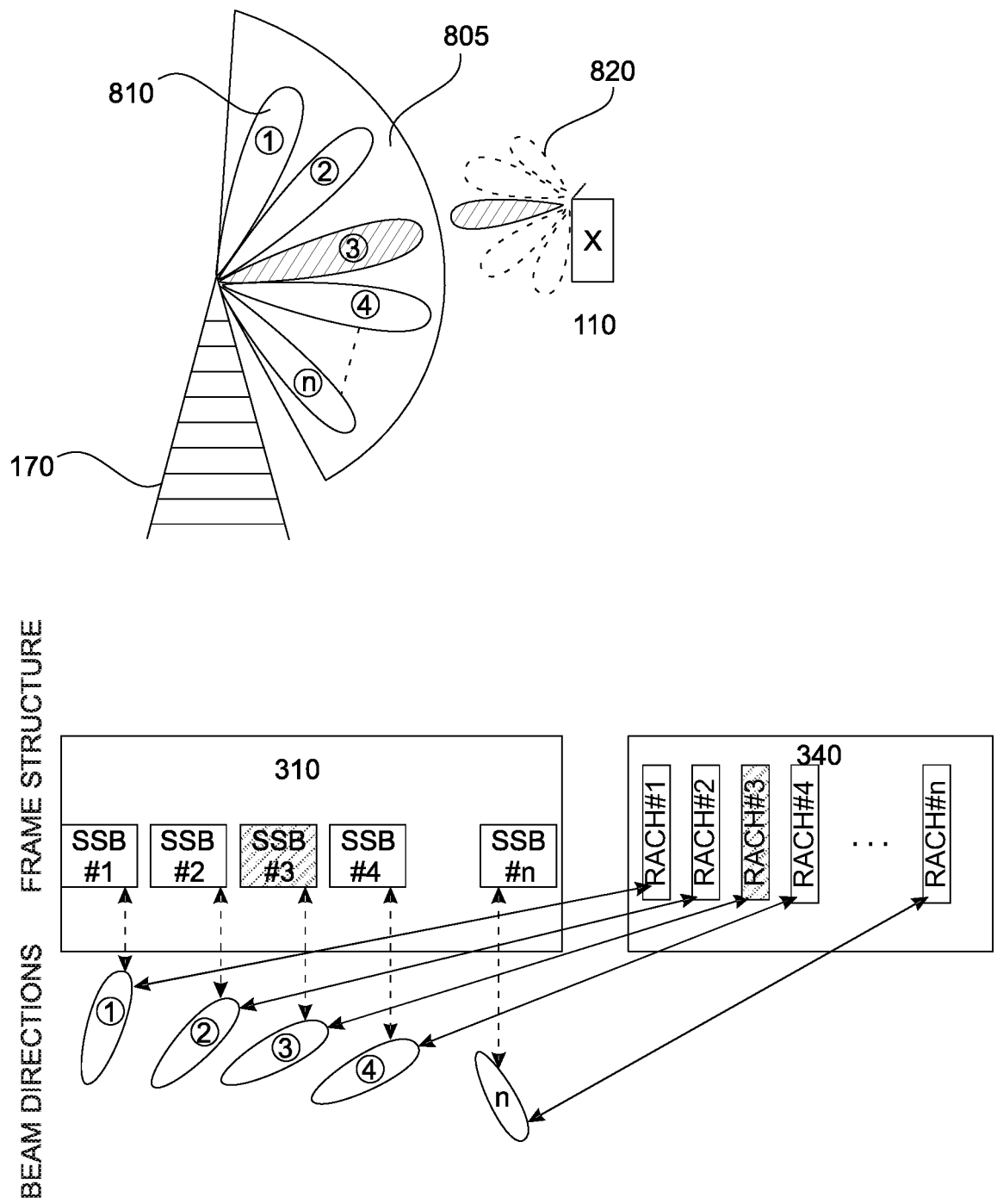
FIG. 7 is a schematic diagram illustrating an example of a base station and a device negotiating establishment of a beam pair.

A BS 170 relies on communication of wireless signals with the ED 110 to determine the position and mobility of the ED 110. As illustrated in FIG. 7, for example, a beamforming antenna array of a BS 170 scans a scanning region 805 to establish beam pairs with the ED 110. A beamforming antenna array can only generate one beam to one direction at one time. Therefore, the beamforming antennas of a BS 170 typically scans the region 805 using different beam directions 810 (e.g., n different angles; also referred to as beam angles), sending DL reference signals (e.g., synchronization signals) at each beam direction 810, and receiving potential UL acknowledgment signals from the ED 110 over one of the direction 810. Similarly, the ED 110 having a beamforming antenna array also scans for the DL reference signals using different beam directions 820. The ED 110 may decode DL reference signals sent over different directions and then transmit an UL acknowledgment signal responding to each of the decoded reference signal. In this example, the ED 110 scans over different beam directions 820, and successfully decodes the reference signal transmitted DL over beam direction #3 (indicated by shading). The ED 110 then transmits the RACH signal on the UL RACH channel corresponding to beam direction #3 (indicated by shading). The acknowledgment information transmitted by the ED 110 typically contains the device ID and channel-related information. In some examples, the BS 170 may receive acknowledgment information from the same device (e.g., as indicated by the device ID contained in the acknowledgement information) from different directions, in which case the BS 170 makes a determination (e.g., selecting the beam direction having highest signal power or highest channel quality) of which beam direction 810 to communication with the ED 110 from then on. The BS 170 may then send DL controlling information (e.g., power control and time advance control messages, among others) and data signals to the ED 110 over the selected beam angle 810. In this way, a beam pair between the BS 170 and the ED 110 is established.

Figure 8:
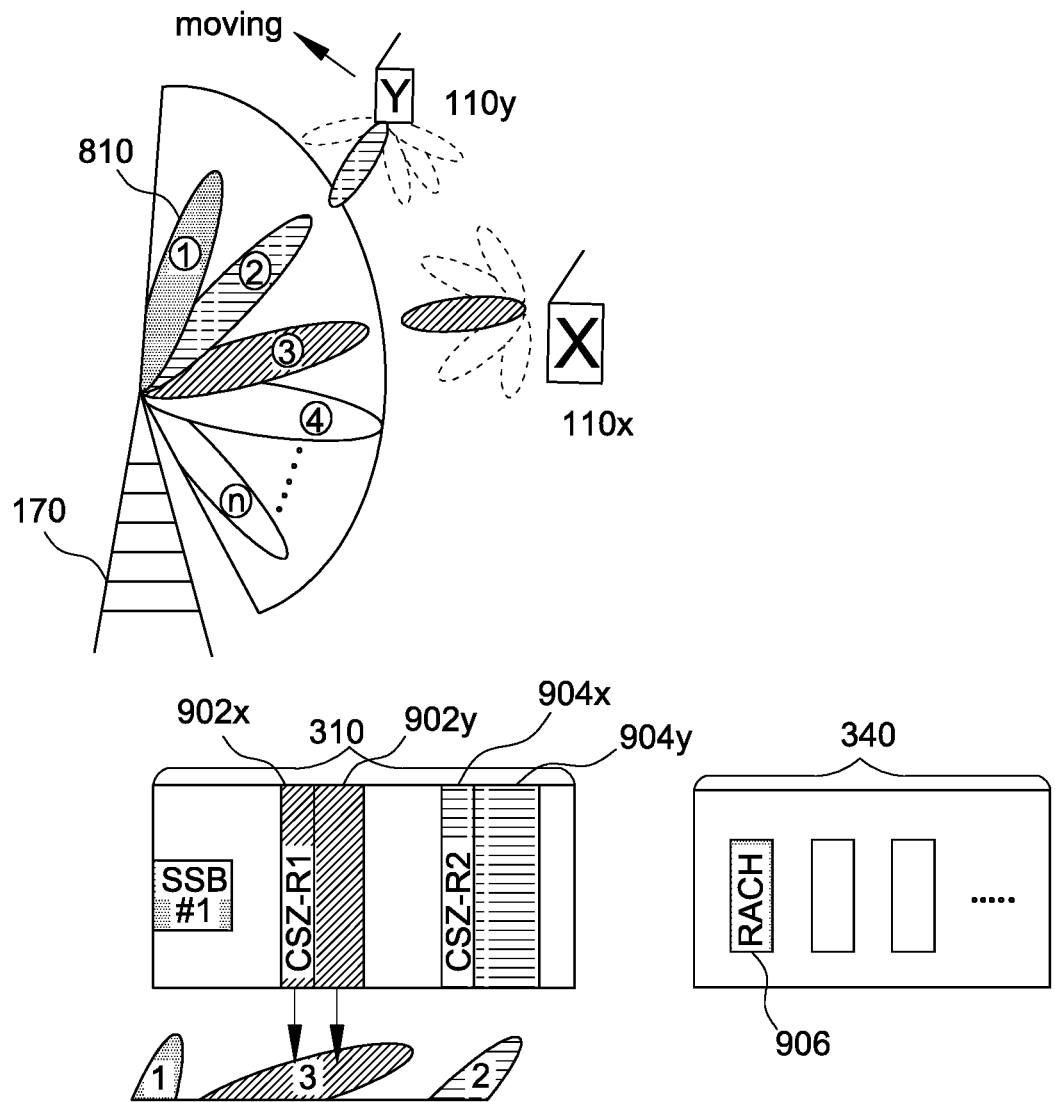
FIG. 8 is a schematic diagram illustrating an example of a base station and two devices negotiating establishment of a beam pair, where one device has mobility.

After the establishment of the beam pair, the BS 170 and/or the ED 110 may monitor the beam pair, which may decay (e.g., due to mobility of the ED 110 or environmental changes). The BS 170 may monitor the UL channel quality to evaluate and adjust beam direction. The ED 110 may monitor the DL channel quality to evaluate and adjust beam direction. The ED 110 may continue to scan and update beam direction, based on measurement of the DL synchronization signals and/or the DL reference signals transmitted with DL data. FIG. 8 illustrates an example where the BS 170 is in communication with two EDs 110x and 110y, which may be time and space multiplexed. References signals 902x, 902y may be transmitted in time sequence with reference signals 904x, 904y on the respective selected beam directions. In this example, the ED 110x decodes DL references signals 902x with the highest receive power. The ED 110x then requests the BS 170 to communicate with the ED 110x using corresponding beam direction #3. Similarly, the ED 110y decodes DL reference signals 904y with the higher receive power. The ED 110y then requests the BS 170 to communicate with the ED 110y using corresponding beam direction #2. Each ED 110x, 110y may also continue to measure reference signals transmitted over other beam directions. For example, in FIG. 8 the ED 110y has mobility. The ED 110y may determine that beam direction #1 has better quality as the ED 110y moves, and the ED 110y may send a request to the BS 170 to ask the BS 170 to adjust to beam direction #1 for transmission.

A general discussion of conventional beam management has been provided above. Some details may differ in specific implementations. Generally, the conventional approach may have drawbacks, such as requiring a significant amount of transmitter and receiver interactions, and requiring consumption of radio resources (particularly when there is ED mobility). For example, this conventional approach may consume a signification portion of DL radio resource to transmit beam-related reference signals over every possible direction periodically. This conventional approach may also consume a signification portion of UL radio resource to transmit the beam-related channel quality measurements.

To benefit from the high throughput that is possible in the mmWave band, it is typically necessary to establish a beam pair and to manage the beam to account for moving EDs and/or moving obstacles. It should be noted that such beam management is required in other frequency bands as well.

Figure 9:
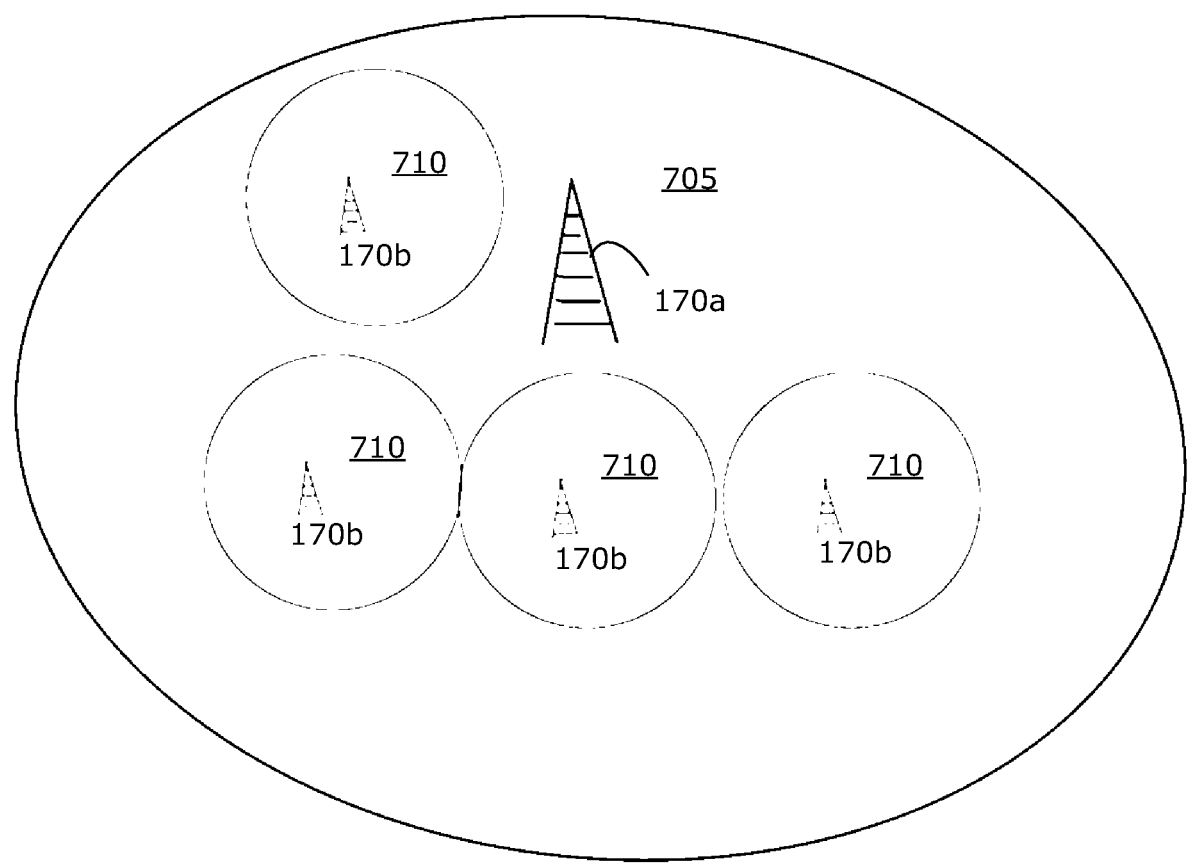
FIG. 9 is a schematic diagram of an example macro cell containing multiple small cells.

In some examples, mmWave communications may be deployed together with other frequency communications. For example, in 5G NR, there may be distinct bands that coexist: such as 28 GHz, sub-6 GHz, and eventually 50 GHz unlicensed bands, in the wireless system. Both the BS 170 and the ED 110 may transceive signals on different bands. Because of good diffraction and less path loss at lower frequency bands, a macro cell may be deployed at sub-6 GHz band for a large coverage and good indoor penetration. A small cell may be deployed, within the macro cell, at 28 GHz or higher bands for higher throughput communications. Generally, a small cell may have a size of about 50 to about 250 meters in diameter, whereas a macro cell may have a size on the order of kilometers. In the example scenario illustrated in FIG. 9, one or more small cells 710 (e.g., operating at 28 GHz) may be set up to provide hot spots within a macro cell 705 (e.g., operating at sub-6 GHz). Each small cell 710 may be served by a respective small cell BS 170b, and the macro cell 705 may be served by a macro cell BS 170a. An ED 110 (e.g., a high-category device) may connect to both the macro cell 705 and a small cell 710 simultaneously (e.g., by establishing connections with both the macro cell BS 170a and one small cell BS 170b). Accordingly, a moving ED 110 may move among two or more small cells 710 but still remain within the same macro cell 705. In some situations, a higher frequency band mmWave may be used in DL transmission and a lower frequency band mmWave or even sub 6-GHz (i.e., non-mmWave) may be used in UL transmission. This is because a BS 170 may use a larger sized antenna array to generate a very narrow beam. In contrast, a small sized antenna array may be used by the ED 110 (e.g., due to size restrictions imposed by the ED size) may not be able to generate a beam that is as narrow as the BS beam. Generally, under the same power conditions, a narrower beam can transmit over a longer distance than a wider beam. Further, the ED 110 typically also has transmit power limitations. Therefore, the UL signal transmitted by the ED 110 using the same mmWave band may not reach the BS 170. Accordingly, the ED 110 may need to select a lower frequency mmWave band or even a non-mmWave band to transmit the UL signal.

There are some challenges for beam management, which may be particularly relevant for mmWave communications. One or more of these challenges may also be applicable (to a lesser extent) to sub-6 GHz or other band communications.

Due to the weak diffraction ability of the high frequency carrier, mmWave communications tend to be sensitive to blockage caused by obstacles (e.g., cars, buildings, human bodies, etc.). In the case of a rapidly occurring blockage (e.g., due to mobility of the ED 110 or mobility of an obstacle), there may be not enough time for both the ED 110 and the BS 170 to adjust their respective beams. The beam pair is lost and a beam recovery procedure (which may be similar to the beam establishment procedure) begins. It may be desirable to reduce the need for beam recovery.

Generally, a mmWave beam is relatively narrow (e.g., having a beam angle of several degrees). Accordingly, the mmWave radio beam may be easily and frequently affected by blockage. This may negatively influence the system throughput.

When the ED 110 is moving, beam adjustment is expected to happen fairly frequently (due to the narrow width of the mmWave beam). Each beam adjustment consumes some system resource, thereby negatively affecting overall system throughput and capacity. Mobility may also introduce blockages over some well-established beam pairs and trigger the beam recovery procedure. A lot of system resources may be used in order to reestablish a beam pair, which may further affect overall system throughput and capacity.

In view of the foregoing discussion, it may be appreciated that conventional approaches to beam management may present challenges and drawbacks, in particular for mmWave communications.

In various examples disclosed herein, an approach is described which uses a sensing system as part of, or as auxiliary to, a wireless communications system. The sensing system may include a plurality of sensors that collect information (e.g., video-like signals or data) about EDs and the surrounding environment. This information may be used to help the wireless system to determine 3D position and/or 3D velocities of EDs and other obstacle objects in real-time or near real-time. In the present disclosure, real-time or near real-time may refer to actions that are performed sufficiently fast to account for changes in the real-world environment. For example, for time-sensitive operations (e.g., to manage communications with a fast-moving autonomous vehicle) updates with a frequency on the order of 10~100 ms may be considered to be real-time or near real-time; for less time-sensitive operations (e.g., to track pedestrians) updates with a frequency on the order of ~seconds may be considered to be real-time or near real-time. In some examples, machine learning approaches may be used by the sensing system to help improve the determination and/or prediction of the position, velocity and/or behavior of an object (e.g., ED or obstacle).

Information (e.g., 3D position information) collected by the sensing system may be associated to specific wireless signals such that information (such as 3D position and 3D velocity, which may be generally referred to herein as 3D coordinate information or coordinate information) of an ED may be associated with the corresponding device ID. As will be discussed further below, the coordinate information may be calculated to a desired degree of precision, depending on the application.

Information about the association between the measured signal-related information from the wireless system and the measured coordinate information of EDs may be accumulated and used to perform future associations. A machine learning system (e.g., a deep neural network (DNN), such as a convolutional neural network (CNN)) may be trained to predict signal-related information (e.g., channel conditions, or beam pair parameters) given a 3D coordinate and certain environmental parameters, for example. This predicted information may be used to aid beam adjustment by the BS and/or the ED. Information from other sources (e.g., other external systems) may also be used to predict signal-related information.

The examples described herein may help to improve performance of a beamforming technology, particularly in the case of ED mobility. For example, with a priori knowledge of the 3D coordinate of a target ED, the BS may directly point the radio beam with appropriate power to this target ED, with relatively high precision, to establish a beam pair. With a priori knowledge of the 3D coordinate of a serving BS, the ED may point the radio beam to the associated serving BS. Similarly, with a priori knowledge or prediction of the 3D coordinate of a targeted ED, the BS and/or ED may change the route of the beam pair. Although some discussion herein refers to mmWave communications, it should be understood that aspects of the present disclosure may be applicable to wireless communications using any band.

In some examples, information from the sensing system may help the wireless system to manage a beam pair. This may be particularly helpful in mmWave communications, because efficient beam management may help to reduce controlling and scheduling overhead. For example, for a given 3D coordinate, the BS may having information for establishing a primary connection (e.g., a LOS connection) with an ED at that given 3D coordinate (with appropriate beam direction and power), and the BS may also have information for establishing one or more alternative connections (e.g., a NLOS connection) with the ED (with appropriate beam direction and power). Information from the sensing system may be used to predict an expected obstacle, and the BS may use this information to schedule the ED to establish the beam pair over an alternative connection in advance of the expected obstacle.

In some examples, information about 3D coordinates of objects and/or EDs (which may be gathered based on mmWave communications) may be useful for communications at different radio bands (e.g., in a macro cell at sub-6 GHz). For example, a macro cell at sub-6 GHz band may contain a number of micro cells at 28 GHz. An ED may be connected to both a macro cell BS and a small cell BS. Information about 3D coordinates of objects and/or EDs within a small cell may be gathered with relatively high precision, and thus the small cell may serve as a positioning gauge that provides such information to the macro cell. For example, channel-related signals (e.g., for DL and/or UL channels) at sub-6 GHz band may be associated with particular 3D coordinates. Using such a priori information about the 3D coordinate of a ED and about the channel state at that coordinate, the macro cell BS may perform optimization operations such as resource allocation, M-MIMO pairing and grouping, power controlling procedure and other such operations, which may be based on the positions of EDs.

In some examples, the BS may be provided with information about the 3D coordinates of one or more associated and tracked EDs. Thus, the BS may use this coordinate information to help schedule direct ED-to-ED communications. For example, the BS may provide coordinate information (e.g., relative positions and velocities) to each ED, and may also provide key transmission parameters of their respective communication targets, in order to help each ED to establish the beam pair for ED-to-ED communications.

Figure 10:
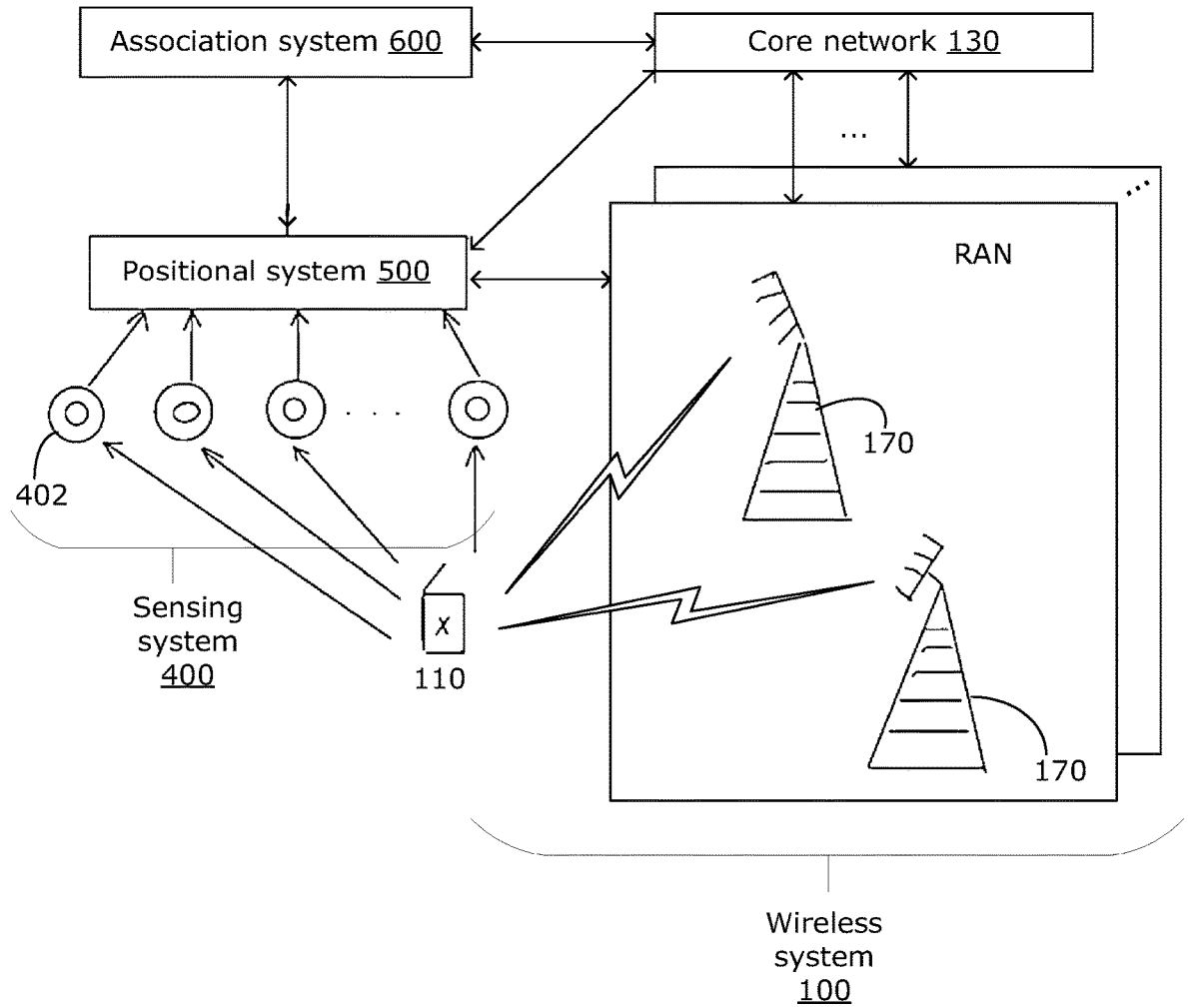
FIG. 10 is a schematic diagram of a use of a positional system together with a wireless system, in accordance with some examples disclosed herein.

FIG. 10 is a schematic diagram of in which a sensing system and a wireless system may cooperate with each other.

In this example, the wireless system 100 is the wireless system 100 discussed above with respect to FIG. 1. In other examples, a different wireless system may be used. The sensing system 400 includes a plurality of sensors 402. The sensing system 400 in this example includes a positional system 500 for determining coordinate information (e.g., 3D position and 3D velocity) from sensed data. In some examples, the positional system 500 may be used as a control system to configure the behavior of the sensors 402 in the sensing system 400. The positional system 500 may receive control orders for the sensors 402 from one or more other systems (e.g., the Internet 150 or the core network 130) and/or may generate these control orders by itself. In some examples, the positional system 500 may be external to the sensing system 400. For example, the sensing system 400 may be just the collection of sensors 402. An association system 600 communicates with both the positional system 500 and the wireless system 100 (in this example, the core network 130 specifically). The association system 600 receives coordinate information from the positional system 500, and receives signal-related information from the wireless system 100. The association system 600 associates the coordinate information with the signal-related information, as discussed further below. In some examples, the association system 600 and the positional system 500 may be implemented together (e.g., at a data center or at a data server). In some examples, the association system 600 may be part of the wireless system 100. For example, the association system 600 may be implemented as part of the core network 130 and/or may be implemented as part of the BS 170. In some examples, the positional system 500 may also be part of the wireless system 100 (e.g., implemented in the core network 130). As will be discussed further below, the positional system 500 and the association system 600 may each contain other systems (e.g., a machine learning system).

In some examples, the sensing system 400 may be set up to monitor for and to generate notification of the occurrence of certain events at the EDs 110 and/or in the environment (e.g., the sensing system 400 may be configured as a fire alarm). The sensed data and notification (e.g., an alarm) may be transmitted directly over the wireless system 100 to reach a target receiver with minimal delay, for example. In one example, the sensors 402 may include one or more non-contact temperature sensors, which may be used to measure the environmental temperature regularly. The measured temperature values may be sent (e.g., at regular intervals, or upon detecting temperatures at or above a certain threshold) to the positional system 500. The positional system 500 may be configured to detect whether the measured temperatures increase rapidly over a pre-set threshold, which may be indicative of a fire or an over-heating situation. The positional system 500 may trigger an alarm and send related information (e.g., position corresponding to the measured high temperature, measured temperature values, etc.) through the wireless system 100 (e.g., via a BS 170 and the core network 130) to a target receiver.

In some examples, the sensing system 400 may receive requests for data and transmit gathered data through the wireless system 100. Such requests may be from a third party, for example. Continuing the above fire alarm example, the target receiver (which may be a third party) may want to have more information (e.g., real-time video data) about the affected area in order to evaluate the situation after receiving the alarm. The target receiver may send out this request. The request may be forwarded through the wireless system 100 (e.g., via the core network 130 and the BS 170) to the positional system 500. The positional system 500 may send the requested information to the target receiver (again via the wireless system 100) if the positional system 500 already has the requested information (e.g., already gathered from the relevant sensors 402). The positional system 500 may also control the sensors 402 to collect the requested information (e.g., if the data has not already been gathered, or if the data that is currently available to the positional system 500 is of insufficient quality) and send the data (with or without preprocessing such as compression, as appropriate) to the target receiver (again via the wireless system 100).

In another example, the request for data may be from an ED 110 that is part of the wireless system 100. For example, an ED 110 may be an autonomous vehicle. In some situations, the autonomous vehicle's camera and/or control system may detect a blind area existing in the field of view (e.g., due to blockage by some obstacle). The vehicle's control system may send out a request for more information about the blind area, and this request may be transmitted to the serving BS 170 currently associated with the vehicle. This request may include, for example the vehicle ID, the blind area (e.g., approximate coordinates of the blind area) and an indication of the data requested (e.g., request to provide real-time images of the blind area). After the BS 170 receives this request, the BS 170 may send it to the positional system 500 with little or no delay. The positional system 500 may analyze this request and select one or several sensors 402 (e.g., sensors 402 directed towards the blind area indicated in the request) in the sensing system 400 to capture and provide the requested data. The positional system 500 may then send the gathered data (e.g., with or without preprocessing such as compression, as appropriate) and optionally related information (e.g., the 3D coordinate of the sensor 402, shooting direction, etc.) though the BS 170 to the requesting vehicle.

The positional system 500 and/or the association system 600 may be implemented using, for example, one or more of the computing units 200 described with respect to FIG. 2 above. For example, one or more functions of the positional system 500 and/or association system 600 disclosed herein may be coded in instructions stored in the memory 208 and executed by the processing unit 201. The memory 208 may include modules (e.g., machine learning module) and/or databases (e.g., table of associated data) for implementing examples disclosed herein.

In some examples, the sensing system 400 may be deployed independently of the wireless system 100. In other examples, the sensing system 400 may be part of the wireless system 100 (e.g., as an auxiliary system or as a sub-system within the wireless system 100). The sensing system 400 may continuously, periodically or intermittently provide sensed data (e.g., real-time or near real-time images, video-like data or relative position to serving BS) about EDs 110 over one or more cells. The sensing system 400 may include one or more types of sensors 402 (e.g., video camera, infrared camera, lidar, radar and mmWave radar, among others) to capture different types of sensed data (e.g., video data, static image data, radar data, or audio data, among others) and may provide sensed data in different environmental conditions. The sensing system may also store or have access to pre-defined environment information which may be generated by another system. For example, the sensing system may store or have access to exact 3D geographical information (e.g., information about the streets distribution, light poles, buildings, etc.) from an external mapping system.

In the present disclosure, video-like data refers to data comprising a stream of images (which may be referred to as frames of the video data). Motion analysis (e.g., using any suitable motion capture algorithm) may be used by the positional system 500 to perform positioning estimation of any objects captured in the video data stream. Image segmentation technology may be used to search and monitor multiple objects in a data stream of images. For example, machine learning technology (e.g., an attention network) may automatically identify any objects of interest captured in the data and may filter out or ignore other objects. Object tracking may also be used by the positional system 500 to follow objects of interest captured in a video data stream, for example.

The sensors 402 may be any suitable sensor currently available or may be developed for the purposes disclosed herein. For example, the sensors 402 may include any sensor commercially used in various fields for obtaining information about the sensed environment in real-time or near real-time. Generally, using better quality sensors 402 may help to improve the quality of data obtained by the sensing system 400. The sensors 402 may be located in various positions and directed towards various different perspectives to cover most or all of a particular physical region.

The information collected from the sensors 402 may have characteristics different from information collected via wireless communications in the wireless system 100. For example, sensed data obtained by the sensors 402 may not be affected by time varying fading decay and Doppler jitter. In comparison, a wireless signal may be subjected to channel distortion and may be eventually biased by a receiver. It may be possible to compensate for the channel distortion in order to obtain a more reliable transmitted signal. However, current wireless standards do not provide details about suitable detection and compensation algorithms may be used to improve the measurement reliability (aside from a minimal requirement). Therefore, the reliability of channel information estimated by an ED 110 may be questionable. The sensing system 400 may address such drawbacks by enabling direct control of the quality of sensed data collected. For example, with an increasing number of the sensors 402, the estimation of a spatial coordinate of EDs 110 may be improved.

The sensors 402 may be located at any suitable location to obtain data about the region of interest (which may include one or more small cells, and which may cover part of or all of a macro cell). One or more sensors 402 may be installed with a BS tower, so that the sensor(s) 402 may provide sensed data with an observation perspective similar to the BS 170. One or more sensors 402 may be located at a distance from the BS 170, for example to obtain data that may be useful for identifying a NLOS radio path. One or more sensors 402 may be located at a location that is convenient for other functions/purposes associated with the sensor(s) 402. For example, a sensor 402 may be a security camera that is installed at a high security location. In some examples, the sensing system 400 may allow on-site upgrades of a sensor 402. For example, when a new sensor 402 is deployed and added into to the sensing system 400, the new sensor 402 may provide a new type of data or a different quality of data. This new type or new quality of data may be used by the positional system 500 as a new dimension of data to help improve overall reliability of device positioning.

The sensors 402 may communicate data to the positional system 500 via wired or wireless connections. For example, a sensor 402 may be relatively fixed in position and may use a private link to communicate with the positional system 500. In some examples, a wireless sensor 402 may use the same radio resources as the wireless system 100. In examples where a sensor 402 is in a relatively fixed position, the 3D geographic position of the sensor 402 may be registered (e.g., via manual entry or sensed by other sensor(s) 402) into the positional system 500. The known position of the sensor 402 may be used as a reference position for determining the 3D coordinate of an object, such as using classic geometric algorithms.

In some case, a sensor 402 may itself have mobility. This may be useful for dynamically locating one or more sensors 402 in a region where more sensing data is desired. In some examples, the positional system 500 may determine that there is insufficient data about a particular region, and may dispatch one or more mobile sensors 402 to obtain data about such a region, such as when a large group of EDs are gathering and moving in that region. For example, when a large number of EDs 110 are gathering at a particular area, the positional system 500 may determine (e.g., using information from the association system 600) a need for more sensed data in that area. The positional system 500 may dispatch one or more mobile sensors 402 to that area. Examples of a mobile sensor 402 include a drone, an autonomous vehicle, a semi-autonomous vehicle, and other manned or unmanned mobile devices. An automatous moving sensor 402 may use information from an onboard or external sensor (e.g., global positioning system (GPS), mmWave radar, or laser radar, etc.) to determine its own 3D coordinates (e.g., including 3D position and/or 3D velocity). In some examples, the positional system 500 may control the positions and/or trajectories of the mobile sensor 402 remotely (e.g., via wireless control signals).

In some examples, the sensors 402 in the sensing system 400 may be connected and accessed by IP addresses. In other examples, the sensors 402 may be assigned by specific identifications (ID) rather than IP address system. The positional system 500 may control the sensors 402 in terms of IP or ID. Different methods may be used to address specific sensors 402, and different sensors 402 may be addressed using different approaches.

In some examples, coordinate information (e.g., including 3D positions and 3D velocities) may be determined in real-time or near real-time using data collected from multiple sensors 402. In some examples, installing sensors 402 with the BS antenna tower may be a lower cost implementation. In cases where there are multiple sensors 402 at different locations on the BS tower, data from the different sensors 402 may be used (similar to a binocular system) to measure the distance of an object to the BS tower using classic geometrical theory. For example, a sensor 402 at a first position may detect an object at a relative 3D position x1, y1, z1; and another sensor 402 at a second position may detect the same object at a relative 3D position x2, y2, z2. Data from the two sensors 402 may be used by the positional system 500 to calculate an absolute 3D position x', y', z' that represents the 3D position of the object relative to the 3D coordinate system of the positional system 500.

In some examples, the precision of the coordinate information may be adapted to different kinds of applications. For example, the beam-covered area is proportional to the beam angle. A beam having a larger beam angle covers a larger area than a beam having a smaller beam angle. Therefore, when providing coordinate information used for beam management, the precision of the coordinate information may be less in management of a beam having a larger beam angle, than in management of a beam having a smaller beam angle.

For example, when the coordinate information is used for beam management operations for a mmWave beam, the coordinate information may require a precision on the order of ~mm in order to be useful; whereas when the coordinate information is used for beam management operations for a sub-6 GHz beam, the coordinate information may only need a precision on the order of ~10-100 cm in order to be useful. The positional system 500 may be capable of calculating coordinate information to the necessary degree of precision, depending on the application. In some examples, the precision of the coordinate information may at least partly depend on the precision and/or sensitivity of the sensors 402.

In some examples, the positional system 500 may receive sensed data for multiple cells or multiple BSs, including both small cells (e.g., mmWave cells) and macro cells (e.g., sub-6 GHz cells). Because each sensor 402 may provide an independent data stream, the positional system 500 (which may be obtaining sensed data for multiple cells) may be configured to manage a multiple dimensional signal space in which objects may be detected and tracked. For example, the positional system 500 may make use of machine learning in order to track an object or perform motion detection in a high dimensional space. A 3D trajectory of a moving object may be tracked as a multiple dimensional trajectory in a multiple-dimensional space.

In some examples, in order to determine absolute 3D coordinate information, a 3D reference may be needed. The 3D positions of one or more relatively fixed objects (e.g., a building or a traffic light) may be known a priori by the positional system 500 and may serve as reference points. When these reference points are captured by the sensors 402, the absolute 3D coordinates of any other sensed objects may be calculated relative to the known reference points.

In some examples, the absolute 3D positions of a sensed object may be determined without the use of reference points. For example, the 3D position of an object may be determined using data collected from multiple sensors 402 that detect the same object from different perspectives and/or from different distances. The positional system 500 may determine one or more fixed objects common to the different perspectives/distances and determine the 3D coordinates the fixed objects. The positional system 500 may then use the 3D coordinates of the fixed objects to enable the determination of 3D coordinates of other moving objects.

It may be expected that the more sensors 402 there are for collecting data about a given region, the more accurate and/or precision the coordinate information determined by the positional system 500. For a large number of sensors 402, it may be more practical to favor wired connections to the positional system 500 instead of wireless connections, in order to control the amount of wireless signals that must be transmitted. In some examples, regardless of whether wireless or wired sensors 402 are used, compression and/or preprocessing may be performed to compress/filter data before wireless transmission to the positional system 500. In general, the present disclosure will refer to compression as a type of preprocessing. Other possible preprocessing operations include filtering, down-sampling, object identification/classification or feature extraction, among other possibilities. Such preprocessing may be performed by each sensor 402, or may be performed by an intermediate node (e.g., an intermediate router that preprocesses data from one or more sensors 402, and that in turn transmits the preprocessed data to the positional system 500). The compression rate for a given sensor 402 may be adaptive to the environment and/or the type of sensed data. For example, a higher compression rate may be used for high quality video-like signals attributed to nice weather visibility. In some examples, the sensed data may be preprocessed such that data is transmitted to the positional system 500 only when an object of interest is captured in the data. In some examples, the preprocessed data transmitted to the positional system 500 may include only a part of the sensed data (e.g., filtering out portions of image data that show the sky). In another example, when there is a large number of sensors 402 providing sensed data, each sensor 402 may transmit a small compressed size of the video-like data. The compression ratio may also be dependent on the tracked objects. For example, if there are more objects to be identified and tracked, a low compression ratio may be selected; otherwise, a higher compression ratio may be used. In some examples, the sensor 402 may itself perform feature extraction to filter out any irrelevant information, so that only data relevant to objects of interest is communicated to the positional system 500.

Tracked objects may include, for example, various devices such Internet of things (IoT) equipment (which may be relative fixed in position most of the time), vehicles, communication devices and humans. Generally, IoT equipment and vehicles may be detected (e.g., using classic (i.e., non-machine learning-based) object detection, or using machine learning-based approaches) and tracked relatively easily (e.g., due to having known regular geometries). It may be more challenging to detect a mobile ED 110, such as a mobile phone in a person's hand. Further, after detecting a mobile ED 110, it may be useful for the positional system 500 to be able to determine (e.g., with associated probabilities) whether that ED 110 is currently in use, not in use or expected to be in use in the near future. The positional system 500 may use machine learning, for example, to identify certain human postures that may be associated with use of an ED 110. For example, in a high throughput use (e.g., video game, video-conference, or video watch), a human may demonstrate some typical postures to hold the ED 110 (e.g., holding the ED 110 up to eye level). A machine learning system within the positional system 500 may be trained to identify typical human postures that are indicative of device use.

Figure 11:
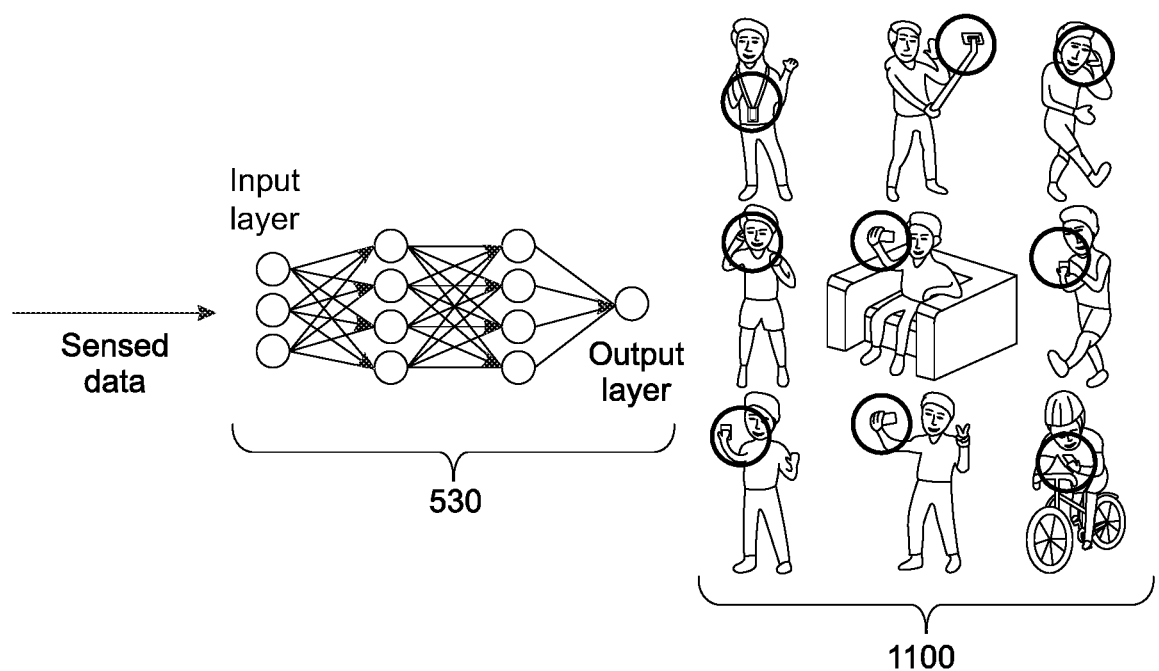
FIG. 11 illustrates the use of machine learning to identify human postures associated with device use.

FIG. 11, for example illustrates some example postures 1100 a human may take when using a device (circled). Sensed data from one or more sensors 402 may be used by a machine learning system 530 (e.g., a DNN) of the positional system 500 in order to determine whether a posture 1100 captured in the sensed data indicates an ED 110 is being used. As discussed above, the machine learning system 530 may also be trained to determine whether a posture 1100 indicates that an ED 110 is likely to be used in the near future (e.g., within the next 1 minute). The machine learning system 530 may also be trained to output a predicted type of device usage (e.g., audio or video), which may help the wireless system to anticipate and prepare for anticipated network traffic.

In some situations, objects in the sensed environment may have relatively predictable trajectories (e.g., movement of vehicles is typically predictable based on the physical road and/or traffic signals, or movement of a pedestrian may be mainly along pavements and crosswalks). Use of an ED 110 may also be relatively predictable. For example, when communication using an ED 110 (e.g., talking on a mobile phone) is interrupted but the ED 110 is maintained in the user's hand, it may be predicted that use of the ED 110 is likely to resume in the near future. Such predictions may be performed by the positional system 500, and the predicted information may be provided to the wireless system 100 (e.g., to help improve efficiencies, as discussed further below).

Figure 12:
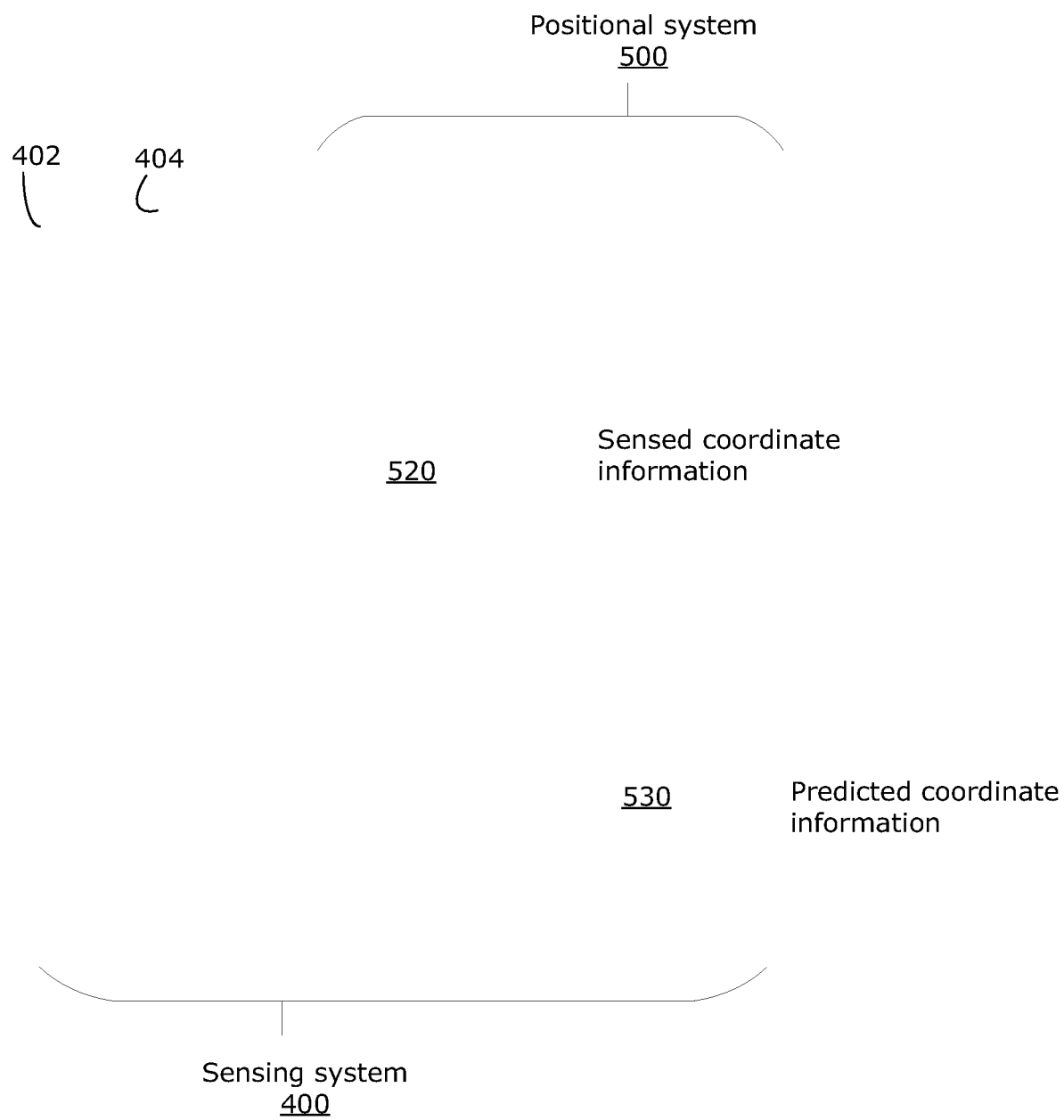
FIG. 12 is a schematic diagram of example modules and sub-systems in a positional system, in accordance with some examples disclosed herein.

FIG. 12 illustrates example systems (also referred to as sub-systems or modules) within the positional system 500, which may be used to determine and predict 3D coordinate information of a sensed object. As explained before, the ED 110 may exist in different forms. For example, the ED 110 can be a mobile station, a cellular telephone, machine type communication unit, a sensor, a laptop, or a tablet, among many other possibilities. In the present disclosure, a "sensed object" may refer to any object of interest that may be sensed by the sensing system 400 (e.g., using sensors 402) and/or by the wireless system 100 (e.g., using wireless communication signals, which may be used to determine coordinate information). For example, the sensed object may be an ED 110 or may include one or more EDs 110. For example, a laptop computer, a mobile phone or a tablet may be an ED 110 and may also be a sensed object. In some examples, persons may be considered as sensed objects. Consider the example of a person who may be carrying an ED 110 (for example, a mobile phone) and put the ED 110 in a place (for example, in the pocket) that is not visible from the outside. The ED 110 being carried in this way may not be detected by sensors 402 in the sensing system 400, but the ED 110 may have wireless communications with one or more BSs 170, which communications may be captured by the wireless system 100. In this way, a person is considered as a sensed object. In some examples, vehicles may be considered as sensed objects. For example, a vehicle may be installed with an ED 110 and in that case the vehicle itself may be considered an ED 110. Further, a vehicle may also carry one or more passengers and each passenger may carry their own ED 110 within the vehicle. An ED 110 installed or carried in a vehicle may be sensed by the wireless system 100 (e.g., via wireless communication signals as discussed above), and the vehicle may thus be considered a sensed object.

The sensors 402 collect sensed data of the sensed region, and an object of interest (e.g., an ED 110) may be captured by the sensed data. In this example, data from each sensor 402 is preprocessed by a preprocessor 404, for example to perform compression of the data before being transmitted to the positional system 500. In some examples, the preprocessor 404 may be integrated into the respective sensor 402, or one preprocessor 404 may serve to compress data from two or more sensors 402. In other examples, preprocessing may not be needed and the preprocessors 404 may be omitted; or preprocessing may only be needed for a subset of sensors 402 (e.g., wireless sensors 402) and the preprocessors 404 may be provided only for that subset of sensors 402. Other such variations are possible. FIG. 12 illustrates the sensed data being input to a coordinate determination module (or system) 520 of the positional system 500. In other examples, the sensed data may be input to another module of the positional system 500, for example an object identification module to extract objects of interest from the sensed data. The coordinate determination module 520 may perform calculations (e.g., classic geometric calculations such as triangulation) to determine the sensed coordinate information of an object.

The sensed coordinate information may be outputted by the coordinate determination module 520 as a vector containing 3D position and 3D velocity information (e.g., <x, y, z, Vx, Vy, Vz>) for a given object. 3D position may be defined by the 3D coordinate of a given object. For example, a geographic coordinate system which commonly includes latitude, longitude and elevation can be used. Any other coordinate system can used as long as a position can be identified, similar to the determination of position from the sensing system 400, positional system 500, association system 600 and/or wireless system 100. For example, in the example of mmWave communications being deployed in the wireless system 100, the coordinate system that is used in the wireless system 100 to indicate the beam direction may be the same as the coordinate system used to indicate the 3D position of a sensed object in the positional system 500. In some examples, the coordinate systems used in the wireless system 100 and positional system 500 may be different. A conversion may be performed (e.g., by the association system 600) so that the coordinate information captured in different coordinate systems may be mapped or otherwise referenced to a common coordinate system.

In some examples, the coordinate determination module 520 may itself perform object identification (e.g., any suitable type of machine learning-based object detection), in order to identify and locate an object of interest (e.g., an ED 110) in the sensed data, prior to calculating the coordinate information for the identified object of interest. The output from the coordinate determination module 520 may be stored locally and/or may be provided to the association system 600 (e.g., to be used to improve beam management operations). The output from the coordinate determination module 520 may also be provided to the machine learning system 530 of the positional system 500, to perform trajectory prediction. For example, the machine learning system 530 may be trained to output predicted 3D coordinate information (e.g., <x', y', z', Vx', Vy', Vz'> for a future time point), based on the sensed coordinate information for a current time point (and optionally one or more previous time points). The output of the machine learning system 530 may also be stored locally and/or provided to the association system 600.

Reference is again made to FIG. 10. As discussed above, the positional system 500 may be used to identify and track objects of interest (e.g., a vehicle, human, phone, tablet, etc.) within a sensed geographic region (which may include one or more cells, such as macro cells and/or small cells). Generally, the information calculated by the positional system 500 may include 3D coordinate information, such as 3D position (e.g., x, y, z coordinates) and 3D velocity or motion (e.g., Vx, Vy, Vz). The coordinate information for a detected object may be generated as a vector associated with that object. The wireless system 100 may collect a different set of information based on wireless signals. For example, the wireless system 100 may collect information about a wireless channel (e.g., channel quality indicator CQI or measured beam states information), and this information may be associated with the UE-ID of a registered ED 110. The information from the wireless signals may generally be referred to as signal-related information, because the information may be derived from signals transmitted over UL/DL communications. An association may be performed (e.g., by the association system 600) to associate an object detected by the positional system 500 with an ED 110 registered or granted in the wireless system 100, so that the coordinate information from the positional system 500 and the signal-related information from the wireless system 100 may be related to each other.

In some examples, the positional system 500 may be deployed inside a RAN 120. The positional system 500 may provide tracking information about a moving objective directly to BSs 170 belonging to the RAN 120. Information about certain object features (e.g., the image of a vehicle)

captured by the positional system 500 may also be sent to and stored in the core network 130 for future usage, for example. The association system 600 may use such stored feature information from the core network 130 to help identify an object and make an association, for example.

Tracking and predicting functions in the positional system 500 are typically time-sensitive functions. Typically, tracking information and predicted information may be more useful when such information is generated and available in real-time or near real-time. To help reduce time delay, it may be useful for at least the tracking and predicting functions of the positional system 500 to be deployed as closely as possible to the relevant BS 170.

As noted previously, in mmWave beamforming, the beams are relatively narrow. The BS 170 sends DL synchronization signals in a series of fixed beam directions over a time sequence. The ED 110 measure and report to the BS 170 one or more of the DL beam directions over which the ED 110 can receive with the highest signal power. Particularly for mmWave beamforming, the quality of beam pairs between the BS 170 and the ED 110 may be more dependent on their relative positions rather than the in-between physical radio channel (including fast fading and frequency selectivity). These characteristics may be used by the association system 600 in associating a position with a wireless device.

Figure 13A:
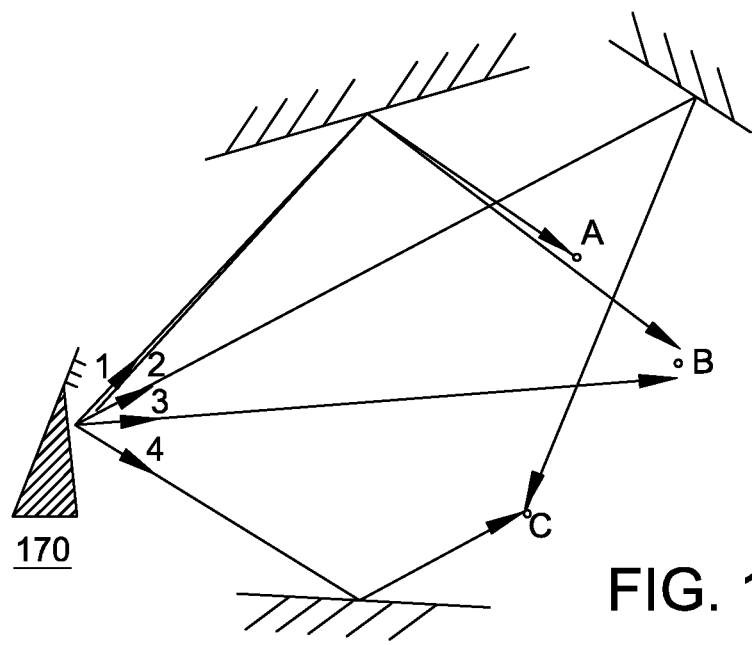
FIGS. 13A and 13B are schematic diagrams illustrating how wireless signals may be used to calculate device position.
Figure 13B:
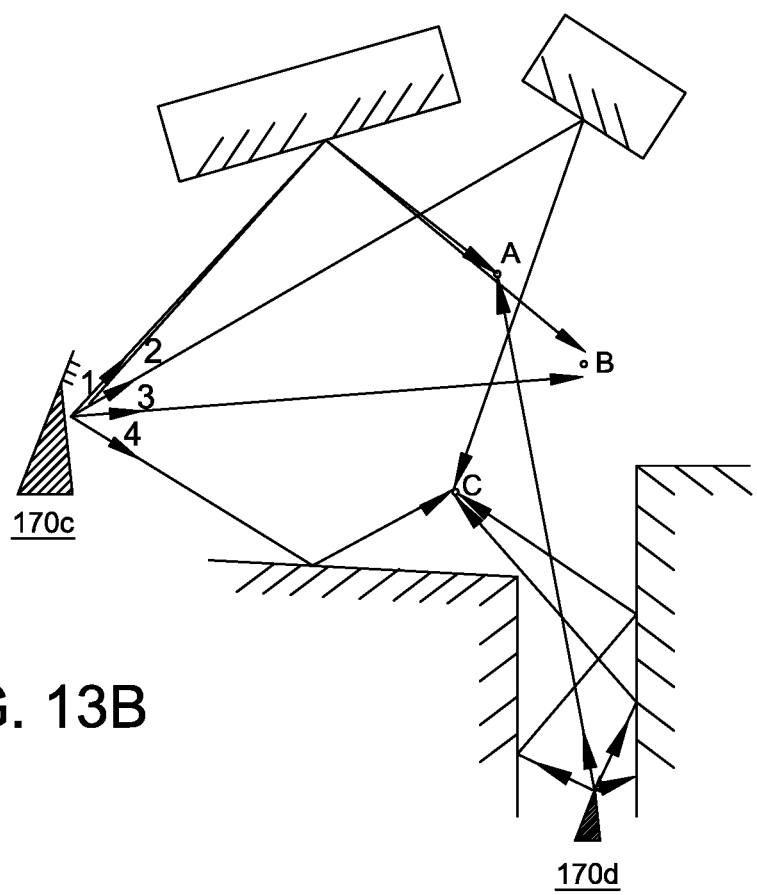

Consider the example shown in FIG. 13A. For simplicity, the BS 170 is illustrated as having four beam directions, #1, #2, #3, and #4. Three physical positions A, B, and C are also shown. A number of reflective surfaces are illustrated as hatched surfaces. Any ED 110 at position A can transceive signals over the reflected beam #1 from BS 170. Any ED 110 at position B can transceive signals over the reflected beam #1 from BS 170 (but at lower signal strength than at position A, because the signal path is longer) and the LOS beam #3 from BS 170. Any ED 110 at position C can transceive signals over the reflected beam #2 and reflected beam #4 from BS 170. Thus, the measurement and feedback of the different beam directions may be used as a basis for calculating whether the ED 110 is at position A, B or C. Another example is shown in FIG. 13B. In this example, there are two BSs 170c, 170d and the ED 110 is capable of dual connectivity, so that the ED 110 may transceive its signals over the beams (LOS or reflected) with multiple BSs 170c, 170d. The ED 110 at position A, B or C can make measurements and provide feedback for beam directions from both BSs 170c, 170d, which may provide more data for calculating the actual position of the ED 110.

Generally, the beam state (including the received DL beam directions, the signal reception power, for example) of an ED 110 at a particular position may be predictable and deducible on the basis of the known transmit DL beam directions, the surrounding environment, the presence of reflective objects and propagation distance. That is to say, the overall measured beam state at the ED 110 may be expected to be dependently more on position and environment rather than the ED 110 itself. Accordingly, a change in position may be expected to result in change in the measured beam state at the ED 110. On that basis, an object identified by the positioning system 500 (using sensed data) may be associated with an ED 110 in a wireless system 100.

For example, the relationship between a given position and the measured beam state by the ED 110 may be calculated using different methods and combinations thereof. For example, for a given position and using known environmental parameters (e.g., based on sensed data), the expected beam state may be calculated (e.g., in a heuristic way) based on reflective or LOS attenuation. For example, the radio path may be extended over the beam direction on a LOS path. The beam signal quality may also be measured at certain positions (at a positional granularity on the order of meters, for example). The beam signal quality at other positions may then be determined by interpolation. The beam state may be also measured by testing EDs or some other power measure instrument in some positions. The distribution of such information may be determined by interpolation. The beam state (e.g., including signal quality) may also be reported by EDs 110 at a given position. The beam quality at other positions may then be determined by interpolation. Other such calculations may be performed. A combination of different calculations may be used to map out the relationship between position and beam state in a given environment.

The signal-related information in a given environment at certain position(s) (e.g., at certain 3D coordinate(s)) can be gathered to create a signal-related map. This map may be generated and stored at and/or accessed by the association system 600. For example, the signal-related map may be stored locally in a memory of the association system 600 or may be stored in another memory location (e.g., in the core network 130 or a database external to the association system 600) that may be accessed by the association system 600. The signal-related map may be in any suitable form. In some examples, the signal-related map may be in the form of a table which contains information descriptive of the environment (e.g., any of the environmental information described above), and associated 3D position, 3D velocity and signal-related information. In some examples, the signal-related map may be in the form of images and associated tables. For example, the images may capture different environments (for example, having different vehicle distributions). The table corresponding to each respective image may contain other information as described above (e.g., 3D position, 3D velocity and/or signal-related information). For the images-and-tables form of signal-related map, referring to or updating the map may start with identifying (e.g., using machine vision techniques, or using labels included in metadata of the images) the most similar image in the signal-related map corresponding to the current environment.

This signal-related map can be updated using signal-related information, such as signal measurements (e.g., sensed from EDs 110 or some other signal measuring instruments in certain position(s)). This signal-related map can also be updated using reports of signal-related information, for example generated from the real field measurement of a tracked ED 110. The signal-related map can be used by the association system 600 to associate coordinate of a sensed object to signal-related information reported by the wireless system 100. This signal-related map can also be used to predict useful wireless communication parameters (e.g., beam state information, CQI and etc.) for a predicted or expected coordinate position of an ED 110, for example as predicted by the positional system 500. These predicted wireless communication parameters can be provided to the wireless system 100 to help establish and/or improve the wireless communication between BS(s) 170 and the ED 110 and/or between EDs 110. Example of further details for generating and using the signal-related map will be discussed below, with reference to FIGS. 24 and 25.

During the initial access, beam adjustment and beam reestablishment procedure, an association may be made between the ED 110 and its 3D coordinate position, using the measured beam state information feedback from the ED 110 and historical information relating beam state to position. Such association may be performed at the association system 600. In some examples, such association may be performed by the BS 170 (e.g., where the association system 600 is at least partly implemented in the BS 170), and may be in turn communicated to the association system 600.

Figure 14A:
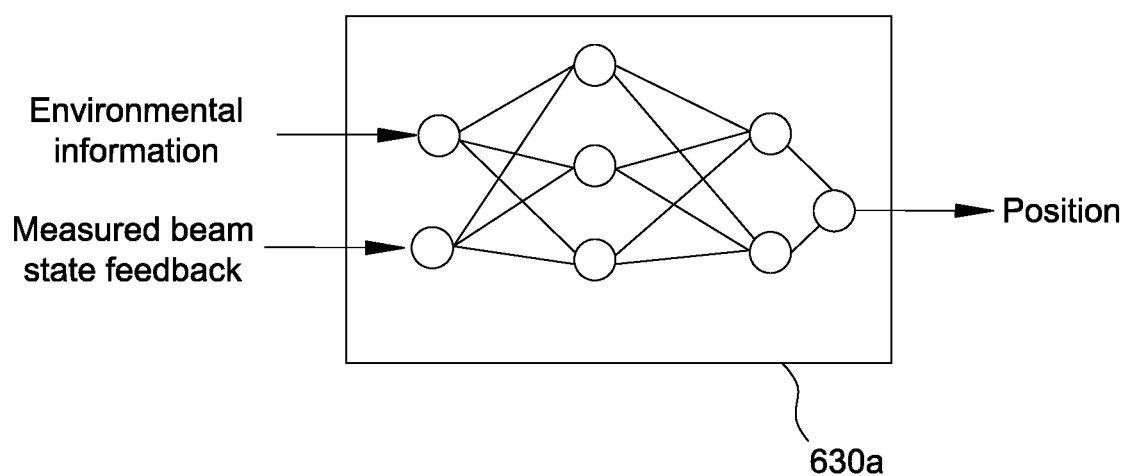
FIGS. 14A and 14B are schematic diagrams of example machine learning systems for predicting possible ED positions and for predicting suitable beam pairs, respectively, in accordance with some examples disclosed herein.

Different methods may be used to estimate possible ED positions using environmental information and information about beam pairs (e.g., measured beam state). FIG. 14A illustrates a machine learning-based approach (in this case illustrated as a neural network) to estimate the possible ED positions. The machine learning may be implemented at a machine learning system 630a of the association system 600. In some examples, the machine learning may be implemented at the wireless system 100, for example at the BS 170. In the example shown, inputs to the neural network are environmental information and measured beam state feedback, and output is the possible ED position. Real-world samples may be accumulated or obtained from a database, as training set to train the neural network. Once trained, the neural network may output possible ED position given environmental information and information about beam pairs. In some examples, in order to get enough labeled data to train this neural network, some under tracked EDs may be requested to report beam state information when the number of EDs in the region is relatively sparse. The neural network may be further trained by adding such newly collected labeled data to training set.

In some cases, an association between the UE-ID of the ED 110 and the position of a detected objection may be made with high probability (e.g., >70% confidence). This may be considered to be a strong association. For example, there may be only one ED 110 sending a wireless signal in a given region and only one object captured in that region, hence the UE-ID of that ED 110 may be associated with the one detected object in that region with high probability. The association system 600 may then associate the UE-ID to the tracked object. In some cases, the association may be made with low probability (e.g., <30%). This may be considered a weak association. For example, there may be many EDs 110 sending wireless signals in close proximity to each other. In the case of a weak association, the association system 600 may store the association as a temporary or unconfirmed association. At a later time, the ED 110 may move or the environmental parameters may change. This would cause a change in measurement feedback from the ED 110, and movement of the ED 110 would also be captured by the positional system 500. One or more such changes in measurement feedbacks and position displacement may be used to strengthen the association reliability. The association system 600 may update a temporary or unconfirmed association to be a confirmed or strong association.

When a strong association has been established (i.e., the association between a UE-ID registered in the wireless system 100 and an object identified in the positional system 500 has high confidence), beam pair adjustment in the wireless system 100 may benefit from coordinate information from the positional system 500. The positional system 500 and association system 600 may continue tracking the ED 110 (including recording its positions and beam state feedbacks, for example) and may also record other environmental parameters (e.g., time of day, weather condition, etc.). Such information may be used as ground truth samples for future usage.

In some cases, the association system 600 may lose track of a previously tracked ED 110. The association system 600 may nonetheless maintain the most recent association, including a record of the last known position and associated signal measurement feedback. If the signals of this ED 110 (e.g., signals having the same UE-ID) reappear at or near the recorded last position, the association system 600 may preferentially associate this ED 110 with an object at or near the recorded last position.

Various methods may be used to estimate the positions of EDs if certain environmental information (e.g., terrain, building, vehicle etc.) and measurement beam state feedbacks are known. Estimation of ED position may be performed using a way machine learning-based approach (e.g., using a neural network) in the association system 600, for example. The inputs to the neural network are environmental information and measurement beam state feedbacks, the output is the estimated device position. A number of actual measured samples may be accumulated or retrieved from a database, to train the neural network. Once trained, the neural network outputs an estimated position given environmental information and measurement beam state feedbacks.

Figure 15:
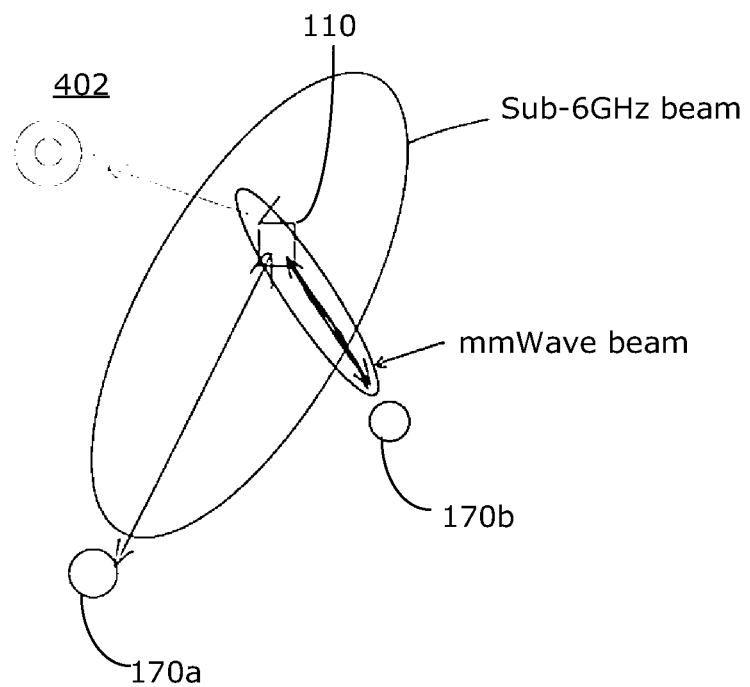
FIG. 15 is a schematic diagram of an example device connected to two communication bands, in accordance with some examples disclosed herein.

An ED 110 may operate on multiple bands at the same time, for example both sub-6 GHz and 28 GHz mmWave. The association that is established by the sensing system 1000 between a detected ED 110 and detected wireless signal may be established on both bands respectively. This may enable the wireless system to take advantage of the benefits provided by both mmWave band and other (e.g., lower) band communications. For example, a benefit of the sub-6 GHz band is its good diffraction property to penetrate solid items. Thus, sub-6 GHz communications may be used in a region that is obstructed from the sensors 402 and from mmWave communications. For example, a benefit of 28 GHz band is high spatial resolution and sensitivity to distance offset. An illustration of this is shown in FIG. 15. In this example, a single ED 110 is connected to two bands: sub-6 GHz band and mmWave band. Channel conditions may be measured over both bands simultaneously. The measurements obtained over both bands may be associated together with 3D coordinate information obtained by the positional system 500.

In some examples, the ED 110 may identify itself to the positional system 500 directly. For example, an IoT device or a vehicle may transmit its device ID (signature) to the positional system 500 (e.g., via a sensor 402 that detects such signals), such as by periodically emitting an identifying signal (e.g., laser signal in an ID-related pattern). Or the sensed data may directly capture identifying information about the ED 110, such as image data that captures the license plate of a vehicle. In some examples, contextual information may be used by the positional system 500 to identify an ED 110. For example, an ED 110 such as a mobile phone may be identified by identifying the user (e.g., using facial recognition technology, or using walking posture recognition).

Examples of using properties of mmWave system to perform the association of coordinate information of sensed objects (from the positional system 500) with device IDs registered in the wireless system 100 have been described. Additionally or alternatively, other methods may be used to perform the association in the association system 600. For example, locally at the ED 110, the ED 110 may have capabilities to determine its own coordinate information. An ED 110 may be installed with sensors and/or instruments to determine its own coordinate information. For example, an ED 110 with a GPS module can determine its own geographic coordinate (usually expressed as a combined 3D Cartesian vector to show latitude, longitude and elevation)

and generate its own coordinate information. In some examples, an ED 110 can determine its own coordinate information by using timing advance (TA) measurement or angle of arrival (AoA) measurement of signals from different BSs 170. Such ED-generated coordinate information can be sent to the BS (or other network-side device). The ED-generated coordinate information may then be reported by the wireless system 100 to the association system 600, enabling the association system 600 to use the reported coordinate information to perform the association. In some examples, various methods may be used by the BS (or other network-side device) to obtain or determine coordinate information for an ED 110. For example, if the ED 110 is a pre-installed IoT device (e.g., installed at a fixed position), the IoT device may register its coordinate information with a BS 170 or the overall network system. In some examples, network-based positioning calculation may be taken. Network side components (e.g., BSs 170) measure the signals originating from an ED 110 and combine the signals to determine an estimation of the position of that ED 110. The wireless system 100 may then report this estimated coordinate information to the association system 600. Regardless of whether the coordinate information is determined by the ED 110 or by the BS 170 (or other network component), the coordinate information may be precise enough (e.g., having cm-level precision) for the association to be performed at the association system 600. In some examples, the coordinate information from the wireless system 100 may identify a sensed object that has not been sensed by the sensing system 400 (e.g., the ED 110 is being carried in a pocket or is otherwise hidden from the sensors 402). In such cases, the association system 600 may nonetheless consider the coordinate information to be associated with a sensed object. In some examples, this coordinate information may be associated with information from the sensing system 400 at some later time when the sensed object is sensed by the sensing system 400 (e.g., the ED 110 is taken out of the pocket).

In some examples, coordinate information may have low accuracy and/or low precision, in which case the coordinate information may be used as additional or supplemental information to help the association system 600 to make the association. For example, the precision of a positioning system may be relatively coarse (e.g., in the range of meters, for examples, GPS accuracy is typically in the range of 4 meters, and accuracy of positioning calculated based on the time of arrival of special positioning reference signals in the LTE system is typically in the range of 50 to 200 meters). Although the precision may be coarse in such a case, such coordinate information may still be sufficient to provide a rough estimation of the position for the ED 110. Such, coarse (or imprecise) coordinate information may be useful as supplementary information to help reduce the area to be considered by the association system 600 to make an association. Further, such coarse coordinate information may help to verify an association that has already been made.

In some examples, data associating measured channel qualities (which may be a type of signal-related information from the wireless system 100) and coordinate information (from the positional system 500) of EDs 110 may be used as training data for a machine learning system (e.g., a DNN). For example, the machine learning system may be trained to predict channel information for any given 3D coordinate. This prediction of channel information may be performed at the association system 600 and/or at the wireless system 100 (e.g., at the core network 130 and/or at the BS 170). In cases where the prediction of channel information is performed at a centralized data center (e.g., at the core network 130 or at a centralized association system 600), the prediction may be on a global or generalized basis. In cases where the prediction of channel information is performed at a more localized entity (e.g., at the BS 170), the prediction may be specific to the channels in the local region (e.g., within the cell).

In some examples, after the association between the detected ED 110 and its wireless ID has been established, the association system 600 and the wireless system 100 may both track the trajectory of the ED 110. This may provide information to the BS 170 about the movement and/or activity of the ED 110. In some examples (e.g., using machine learning by the core network 130 and/or by the association system 600) the BS 170 may know predicted information about expected future movement and/or activity of the ED 110. This information may be useful for beam management. In order to establish and maintain a beam pair between the BS 170 and ED 110, further information may be used, such as information to select an appropriate beam direction, appropriate beam power and appropriate modulation coding scheme (MCS).

Figure 14B:
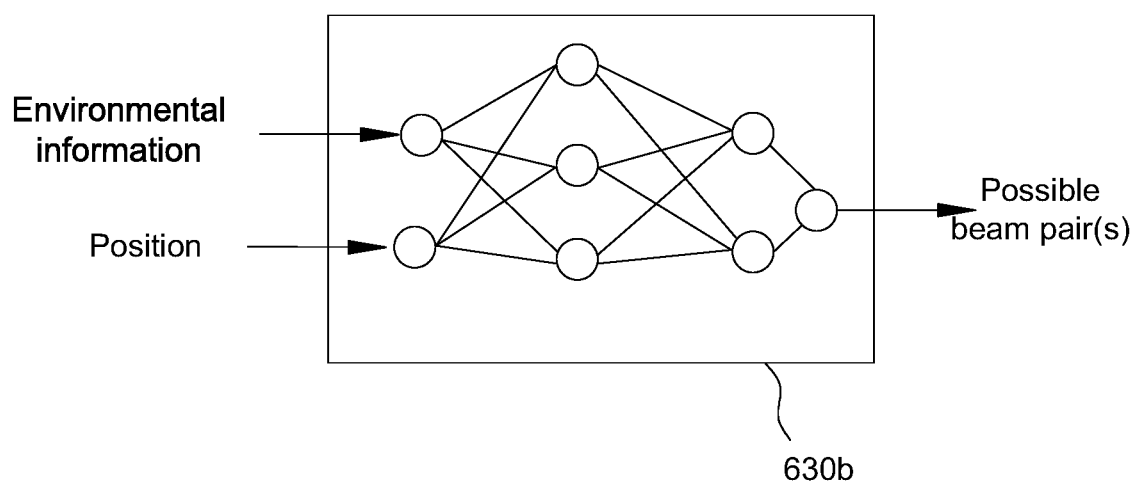

Different methods may be used to estimate possible beam pairs if the environmental information and positions are known. FIG. 14B illustrates a machine learning-based approach (in this case illustrated as a neural network) to estimate the possible beam pairs. The machine learning may be implemented at a machine learning system 630b of the association system 600 or positional system 500. In some examples, the machine learning system 630a of FIG. 14A may be similar to the machine learning system 630b of FIG. 14B. In some examples, the machine learning may be implemented at the wireless system 100, for example at the BS 170. In the example shown, inputs to the neural network are environmental information and positions, and output is the possible beam pair(s) (where information about the possible beam pair(s) may include the beam direction for the BS 170 and the relative beam direction for ED 110). Real-world samples may be accumulated or obtained from a database, to train the neural network. Once trained, the neural network may output possible beam pairs given environmental information and position. In some examples, in order to get enough labeled data to train this neural network, some under tracked EDs may be requested to report beam state information when the number of EDs in the region is relatively sparse. The neural network may be further trained by adding such newly collected labeled data to training set. The predicted beam direction for the BS 170 can be used as a DL transmitter beam direction and an UL receiver beam direction. This prediction may be unrelated to the frequency band used by the ED 110. In some examples, the predicted relative beam direction for the ED 110 may be provided to the ED 110 together with information about the BS position. The ED 110 may use this information to calculate the DL receiver beam direction and the UL transmitter beam direction.

Power and MCS may be related to channel condition or quality. Conventionally, channel-related information is measured by the BS 170 for UL channel and ED 110 for DL channel, and using feedback from ED 110. The wireless system 100 may predict channel condition based on the 3D coordinate (e.g., 3D position and 3D velocity) and device type of an ED 110. Machine learning may be used to estimate channel conditions for different 3D coordinates, different device types and/or different global parameters, based on training using actual data.

Figure 16:
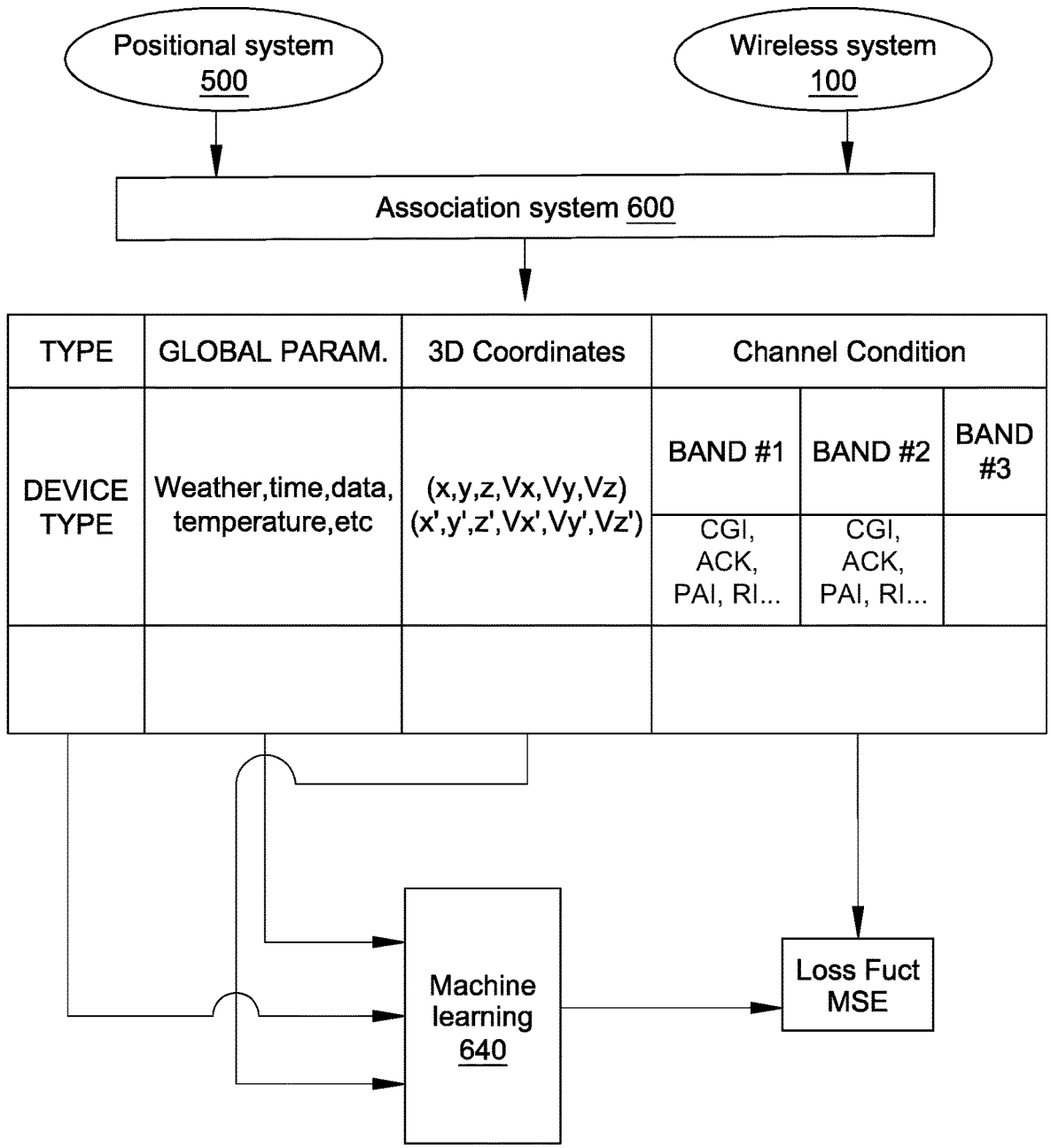
FIGS. 16 and 17 are schematic diagrams of an example machine learning system for predicting channel conditions, in accordance with some examples disclosed herein.
Figure 17:
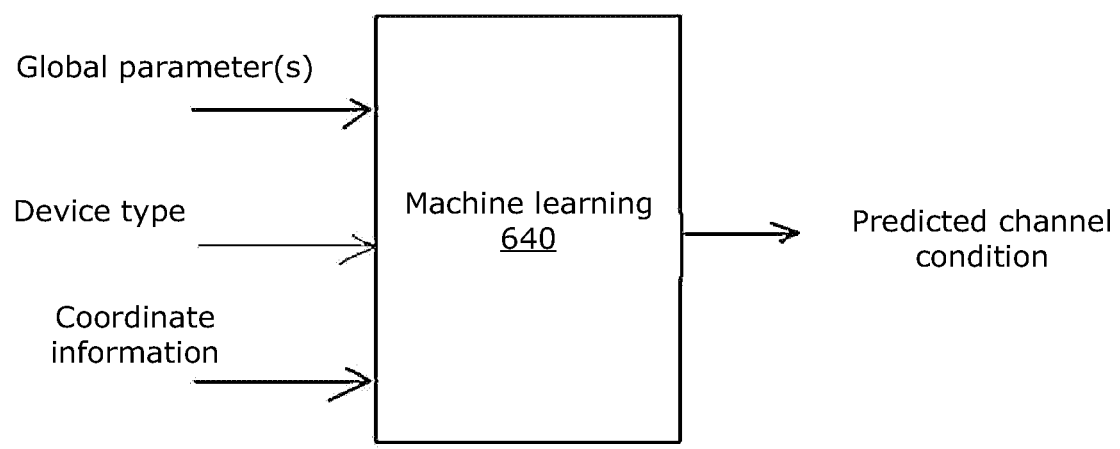

Reference is made to FIGS. 16 and 17, illustrating an example of using a machine learning system for channel condition prediction. In the example shown, 3D coordinate information from the positional system 500 and channel information (e.g., channel conditions associated with respective wireless bands and/or respective device types) from the wireless system 100 are associated (e.g., using the association methods discussed above) by the association system 600. The associated data for each tracked ED 110 may be outputted by the association system 600 and/or stored, for example as a table. In the example table shown in FIG. 16, an entry may associate a device type (e.g., vehicle, IoT equipment or communication device, among others), global parameters (e.g., weather, time, date, temperature, or other environmental data), coordinate information (there may be multiple sets of 3D coordinate information for a mobile ED 110) and channel information (e.g., channel conditions on different bands, including non-mmWave band, for both UL and DL channels). The associated data may be used as input to a machine learning system 640 to output channel conditions.

The machine learning system 640 may be implemented in the association system 600 (as illustrated) and/or the wireless system 100. Measured actual channel condition information may be used to train the machine learning system 640 (e.g., using a loss function and a mean square error). After the machine learning system 640 has been sufficiently trained, the machine learning system 640 may be used (e.g., by the wireless system) to perform inference in order to predict (or estimate) a channel condition, for a given input device type, given 3D coordinate and given global parameter(s), for example. The prediction of channel condition by the machine learning system 640 may be based on the acceptable assumption that the channel condition of an ED 110 at a given 3D coordinate would be similar to that of other EDs of the same type at or near the given 3D coordinate, and in a similar environment. The predicted channel conditions may be for different bands together or individually. As new data is gathered and the associated data is updated, the training data may be updated and the machine learning system 640 may be retrained and updated. In some examples, the channel condition information used in training may be collected from a UL ED report containing measurement of DL transmission. The machine learning system 640 may be used to predict the DL channel condition, and may help to determine the appropriate DL transmission power and MCS combination. In some examples, the channel condition information used in training may be collected from a BS-measured UL transmission from an ED 110. The machine learning system 640 may be used to predict the UL channel condition, and may help to determine the appropriate UL transmission power and MCS combination to be used by the ED 110. The BS 170 may use the predicted UL transmission power and MCS combination to allocate the ED UL transmission.

In some examples, prediction of the precise channel condition may be difficult. For example, the BS 170 may be only provided the beam pair information (outputted by the machine learning system 630b of FIG. 14b). The precise channel condition may be calculated using a non-machine learning approach (e.g., using conventional calculations).

In some examples, the mmWave band may be used only for transmission in the DL direction and transmission in the UL direction may use a non-mmWave band. In such a case, the BS 170 may still use the predicted beam pair information (outputted by the machine learning system 630b of FIG. 14b) for determining the appropriate DL beam direction. The BS 170 may also use the predicted DL channel condition to decide the appropriate DL transmitter power and MCS combination for the ED 110.

Although the present disclosure describes the use of machine learning systems, such as the machine learning system 630b for beam pair prediction and the machine learning system 640 for either DL channel condition prediction or UL channel condition prediction, it should be understood that a non-machine-learning approach may be used instead. For example, conventional calculations may be used instead to calculate the beam pair, DL channel condition and/or UL channel condition.

The output of the machine learning system 640 may be used to help improve beam management in the wireless system 100. For example, predicted channel condition both for DL and UL (outputted by the machine learning system 640) may be used together with the predicted beam pair information (outputted by the machine learning system 630b of FIG. 14B), to provide information about the predicted channel condition for a predicted 3D coordinate (e.g., within the near future, such as within the next second) of a mobile ED 110. This information may enable the BS 170 to prepare a beam pair for the next moment in advance. Preparing a beam pair may include, for example, calculating a new beam direction and/or new beam power and/or decide MCS combination, and/or changing to the new beam direction and/or new beam power and/or another MCS combination. For example, the BS 170 may be provided with the predicted channel condition and the predicted beam pair information. The BS 170 may then determine the appropriate beam parameters (e.g., beam direction, MCS combination and beam power) that should be used at the BS 170 in order to maintain a good beam pair with the ED 110. The BS 170 may further provide some or all of the predicted information to the ED 110, to enable the ED 110 to adjust its own beam as appropriate. This may help to avoid or reduce the number of interactions required for beam management (compared to the conventional beam management procedure).

For example, given the measured or predicted coordinate information for the ED 110, the BS 170 may prepare a beam pair for establishment or for tracking purpose, based on the predicted channel condition. Instead of preparing one primary beam pair, the BS 170 may generate one or more candidate beam pairs in case the primary beam pair become blocked (e.g., due to a moving obstacle).

Figure 18:
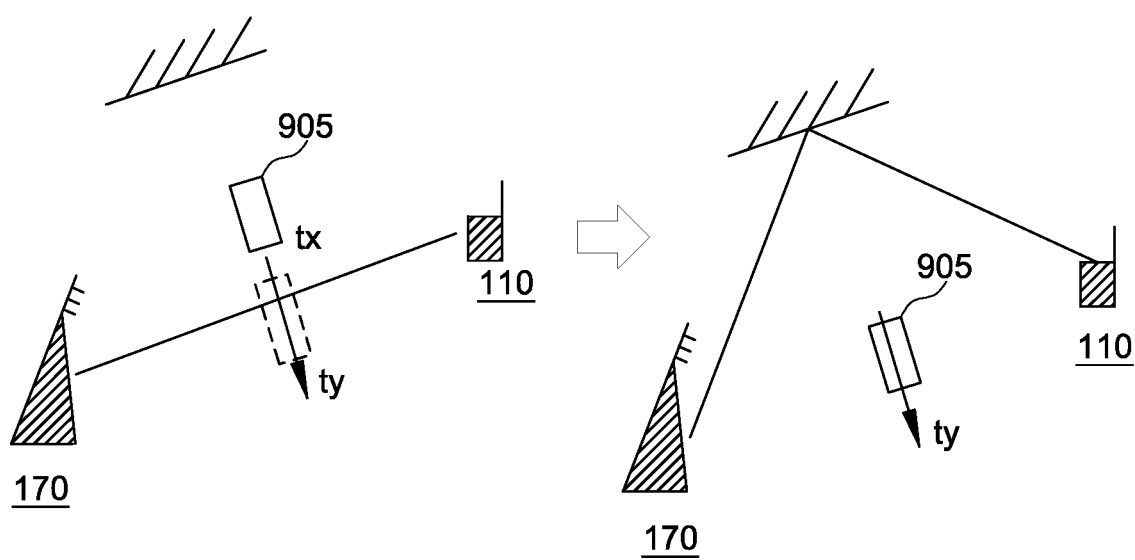
FIG. 18 illustrates the use of predicted information for preparing a beam pair to account for a moving obstacle, in accordance with some examples disclosed herein.

The positional system 500 may track and predict the trajectories of different objects of interest, including EDs 110 as well as other objects (e.g., stationary obstacles and moving obstacles) in the sensed environment. Information about the predicted trajectories of moving obstacles may be provided to the wireless system 100 (e.g., directly communicated from the positional system 500 to the wireless system 100, or communicated via the association system 600). Consider the example illustrated in FIG. 18. As illustrated in the left figure in FIG. 18, the positional system 500 may detect a moving obstacle 905 (e.g., a moving vehicle) which may block the current beam pair between the BS 170 and ED 110. The positional system 500 may predict (e.g., using the machine learning system 530) that the obstacle 905 is moving in a trajectory. The positional system 500 may use information about the predicted trajectory of the obstacle 905 and information about currently established beam pairs (obtained from the wireless system 100) to determine that at time from time tx to ty the obstacle 905 is expected to block the current beam pair between the BS 170 and the ED 110. The positional system 500 may notify the wireless system 100 (e.g., via communications to the core network 130 or directly to the BS 170 that is affected) that between time tx to ty the current beam pair between the BS 170 and the ED 110 is predicted to be blocked. This information may be used by the wireless system 100 to enable the BS 170 to select an alternative path (e.g., a NLOS path), from time tx to ty, to maintain a beam pair with the ED 110 (see right figure in FIG. 18), and the BS 170 may return to the previous path (e.g., a LOS path) for the beam pair after time ty.

Figure 19A:
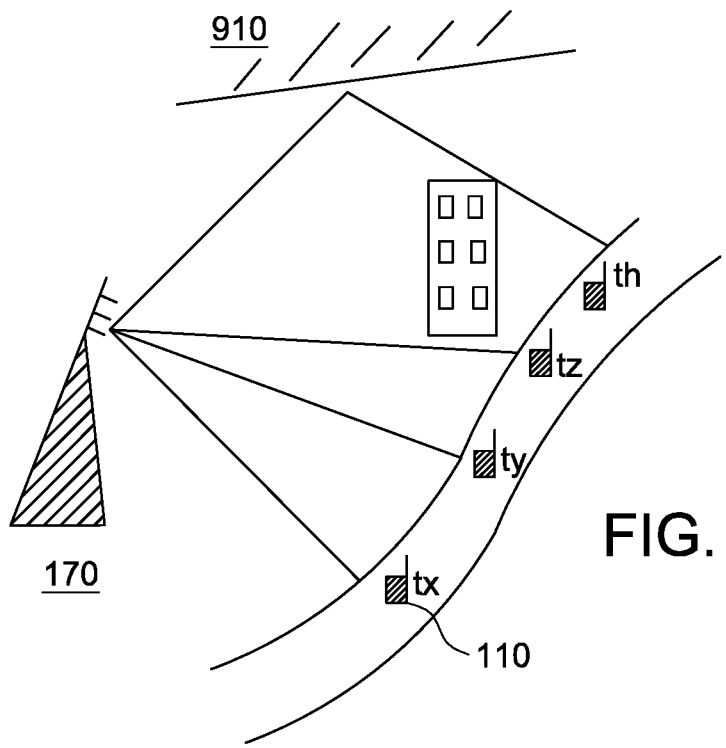
FIGS. 19A and 19B illustrate the use of predicted information for preparing a beam pair to account for a moving device, in accordance with some examples disclosed herein.
Figure 19B:
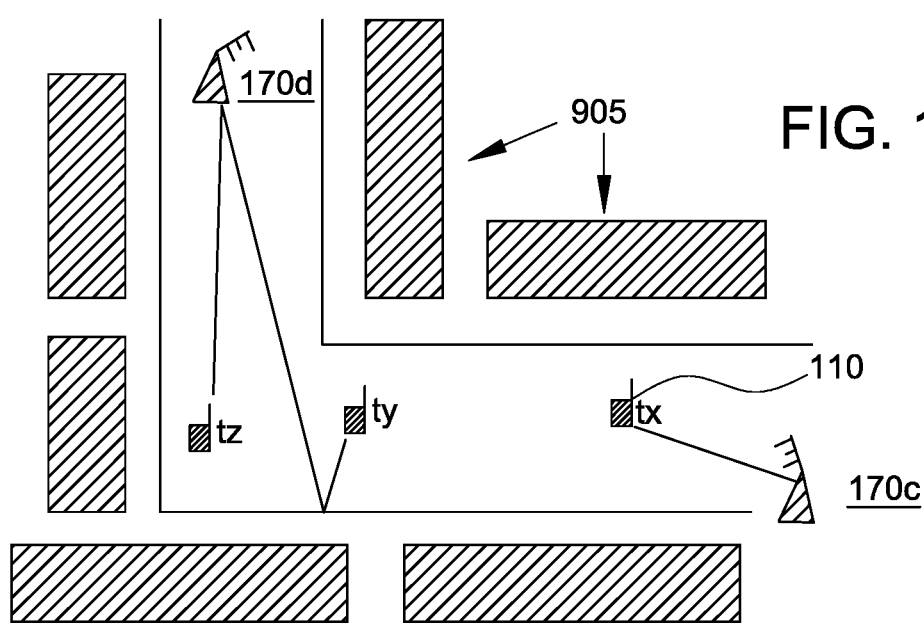

FIGS. 19A and 19B illustrate other examples of how information about tracked and predicted trajectories may be used to help beam management. In FIGS. 19A and 19B, tx, ty, tz and th are different moments in time. In FIG. 19A, the BS 170 and ED 110 have established a beam pair. At tx, the ED 110 starts moving. The positional system 500 may predict the trajectory of the ED 110 and predict the location of the ED 110 at ty. In the example shown, the positional system 500 may use information about the sensed environment, such as the presence of a road, to help predict the trajectory of the ED 110. The environmental information and the predicted position at ty may be provided as input to the machine learning system 630 (e.g., as shown in FIG. 14) for predicting a suitable beam pair. The machine learning system 630 may output more than one predicted suitable beam pair, and may prioritize the candidate beam pairs (e.g., according to predicted signal quality). The BS 170 may select one of the candidate beam pairs to use at ty, and may prepare the selected beam pair in advance of ty. The BS 170 may transmit information to the ED 110 (e.g., information about the beam angle that will be used by the BS 170 at ty, and information about the predicted location of the ED 110 at ty) to enable the ED 110 to prepare for the beam pair at ty. As illustrated in FIG. 19A, the use of predicted information may enable the BS 170 (and possibly the ED 110 also) to select and prepare a NLOS beam pair (using reflection off reflective surface 910) in anticipation of an obstacle.

FIG. 19B illustrates a procedure similar to that discussed above with respect to FIG. 19A. In the example of FIG. 19B, the predicted information may be used to select and prepare beam pairs among two or more BSs 170c, 170d, taking into account obstacles 905 (e.g., buildings). The core network 130 may be used to coordinate the selection and preparation of beam pairs among multiple BSs 170c, 170d. For example, the machine learning system 630 (which may be implemented in the core network 130 or in the association system 600, for example) may be used to predict candidate beam pairs for two or more BSs 170c, 170d that cover the predicted trajectory of the ED 110. The candidate beam pairs outputted by the machine learning system 630 may include beam pairs using either BS 170c, 170d, for example. The core network 130 or the individual BSs 170c, 170d may select the beam pair, and the BSs 170c, 170d may prepare the beam pair similar to that described above. The BSs 170c, 170d may also initiate any necessary handover procedure in advance of ty, for example. Information about the predicted trajectory may also help to avoid a ping-pong handover (i.e., where handover between BSs 170c, 170d occurs back and forth rapidly in a short time frame).

In some examples, a BS 170 may send its own coordination information to an ED 110. The ED 110 may have capabilities to determine information about its own posture or orientation (for example, using a build-in orientation sensor such as an accelerometer in a mobile phone). The ED 110 may combine the information about the position of the BS 170 and the information about the orientation of the ED 110 itself to decide its own beam direction.

In some examples, information about the posture or orientation of an ED 110 may be useful to a BS 170 to help establish and/or improve a beam pair between the BS 170 and that ED 110. For example, if the ED 110 is a wirelessly connected vehicle, if the BS 170 has information about that vehicle's orientation (e.g., the orientation of the forward direction of the vehicle), the BS 170 may more effectively determine parameters for the beam pair to use between the BS 170 and that vehicle (e.g., the ED's beam direction may be in the form of a predefined index which may be defined relative to directions from the ED's point of view). The BS 170 can send the beam pair information to the ED 110 and guide the beam selection at the ED 110. The information about posture or orientation of the ED 110 can additionally or alternatively be captured by the positional system 500 or be reported to the BS 170 (or other network-side device) by the ED 110.

In some examples, information that is obtained on the basis of mmWave communications (e.g., relationship between 3D coordinates and signal strength, which may be calculated based on signal-related information from mmWave communications, as shown in FIGS. 13A and 13B) may be helpful for macro cell communications at sub-6 GHz. For example, in a typical deployment scenario, a macro cell at sub-6 GHz band may contain a plurality of small cells at 28 GHz. An ED 110 may be connected to both the macro cell BS 170a and one small cell BS 170b (see FIG. 15, for example). The positional system 500 may use information derived from small cell communications to determine the 3D coordinate of the ED 110 with relatively high precision. The association system 600 may associate the channel-related signals in both DL and UL at sub-6 GHz band to the 3D coordinate. Further, channel conditions at that 3D coordinate may be predicted. This information may be provided to the macro cell BS 170a. With such a priori knowledge of the 3D coordinate of the ED 110 and predicted channel state at that coordinate, the macro cell BS 170a may perform optimizations such as resource allocation, M-MIMO pairing and grouping, power controlling procedure, or other such procedures, based device positions.

Using information from both the positional system 500 and the wireless system 100, a map may be constructed to relate signal-related information to 3D coordinates. For example, such a map may enable prediction of channel-related information on different bands, over a geographical region. In another example, such a map may help to determine primary and secondary connection candidates for a given 3D coordinate. Such a map may also help to calculate the 3D coordinate of a connected and active ED 110, based on signal-related information measured by the ED 110.

Figure 20:
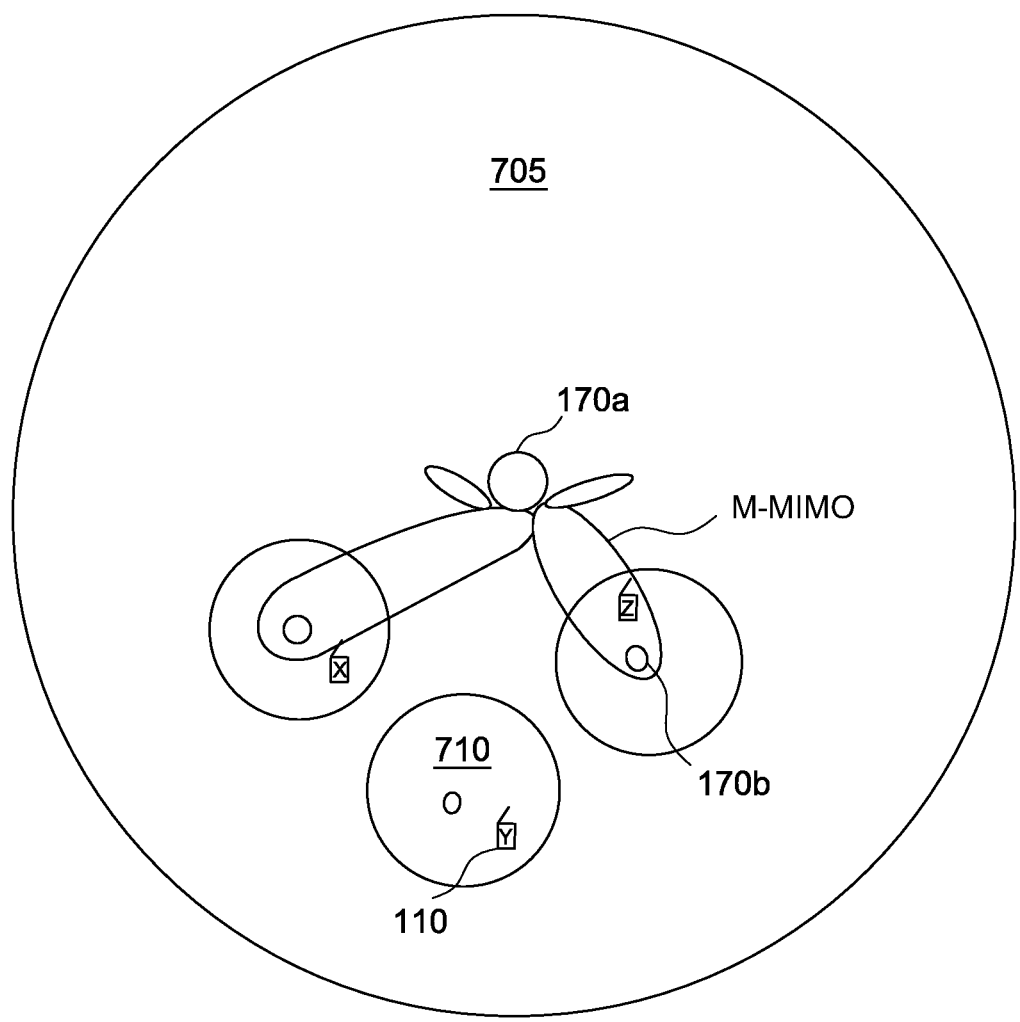
FIG. 20 is a schematic diagram of an example of M-MIMO communications, in accordance with some examples disclosed herein.

Positional information (e.g., 3D coordinate or predicted 3D coordinate) of the ED 110 may be useful for wireless communications. For example, a resource allocation scheduling algorithm in a macro cell may make use of predicted channel-related information of devices based on predicted trajectories of EDs, where such predictions may be based on mmWave communications. In another example, handover overhead may be reduced by providing position and/or predicted trajectory information about the ED as part of the handover. In another example, the ability to determine the positions of EDs to a relatively high precision may enable the BS group the nearby EDs together for group broadcast, or pair two distant EDs for multiple-user MIMO (MU-MIMO) allocation. FIG. 20 illustrates an example in which a macro cell 705 encompasses three small cells 710. Coordinate information may be obtained based on communications between EDs 110 and small cell BSs 170b. This coordinate information may be used by the macro cell BS 170a to coordinate MU-MIMO communications (e.g., to enable selection of precoding and/or channel) as shown.

In some of the discussions above, the BS has been described as radiating a radio beam having one main lobe in one direction. In conventional deployment, one area is covered by one beam-forming antenna array of the BS 170. That is, within this area, there is one beam pointing at one beam direction at any time.

Figure 21:
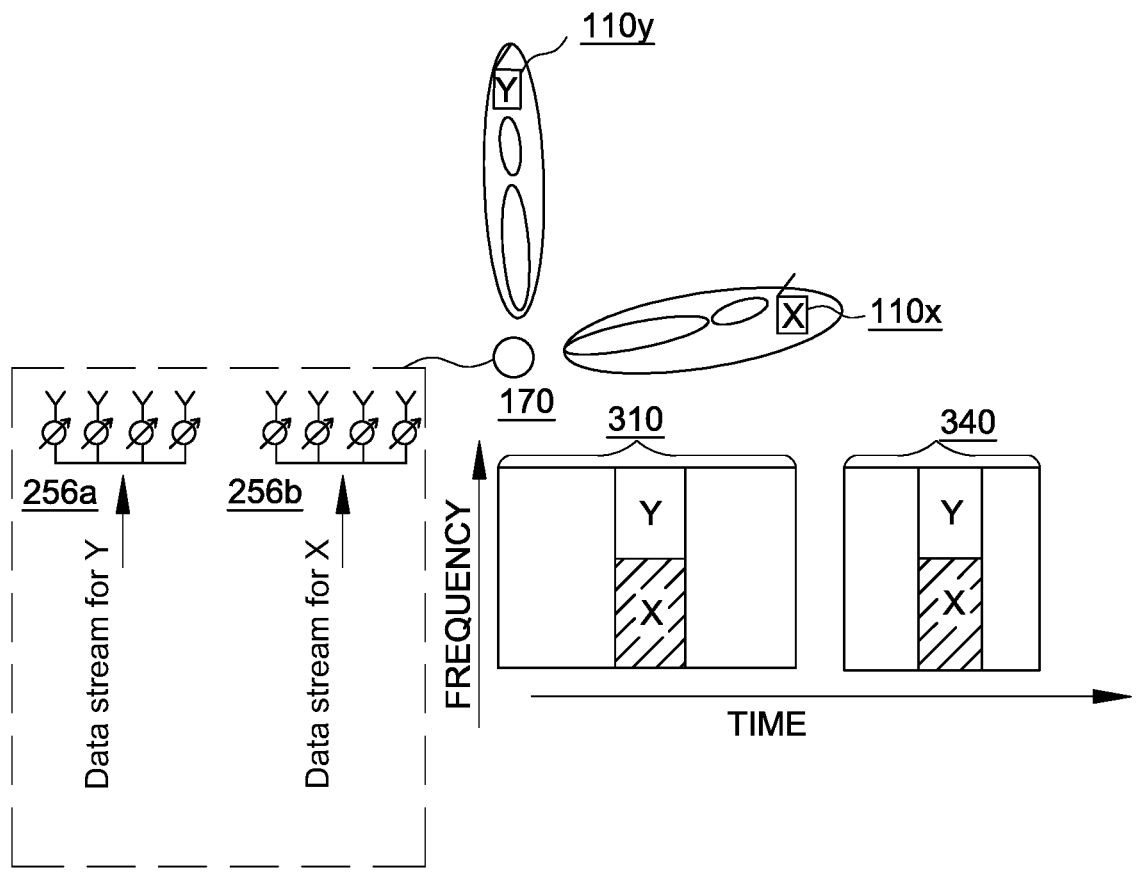
FIG. 21 illustrates the use of two simultaneous beam pairs by a base station for communicating with two different devices, in accordance with some examples disclosed herein.

In some examples the present disclosure may enable a BS to radiate one or more beams simultaneously (e.g., using two or more antenna arrays, or by dividing one antenna array to operate as two or more sub-arrays), which may help to improve system throughput. This may be facilitated by the use of coordinate information from the positional system 500 and association system 600. For example, coordinate information from the positional system 500 may be to avoid interference among different beams transceiving at the same time. An example is shown in FIG. 21. The BS 170 in this example includes two (or more) antenna arrays 256a, 256b, each receiving respective data streams intended for transmission to two (or more) EDs 110y and 110x, respectively. The BS 170 may be provided with coordinate information indicating the positions of each ED 110x, 110y. The BS 170 may, using this information, determine that there is sufficient spatial separation between the EDs 110x, 110y to enable simultaneous transmission to both EDs 110x, 110y using two separate beam pairs, without significant interference. As shown, DL transmissions from the BS 170 to the EDs 110x and 110y may take place simultaneously in the DL frame 310 using different frequencies; similarly, transmission from the EDs 110x and 110y to the BS 170 may take place simultaneously in the UL frame 340 using different frequencies.

Figure 22:
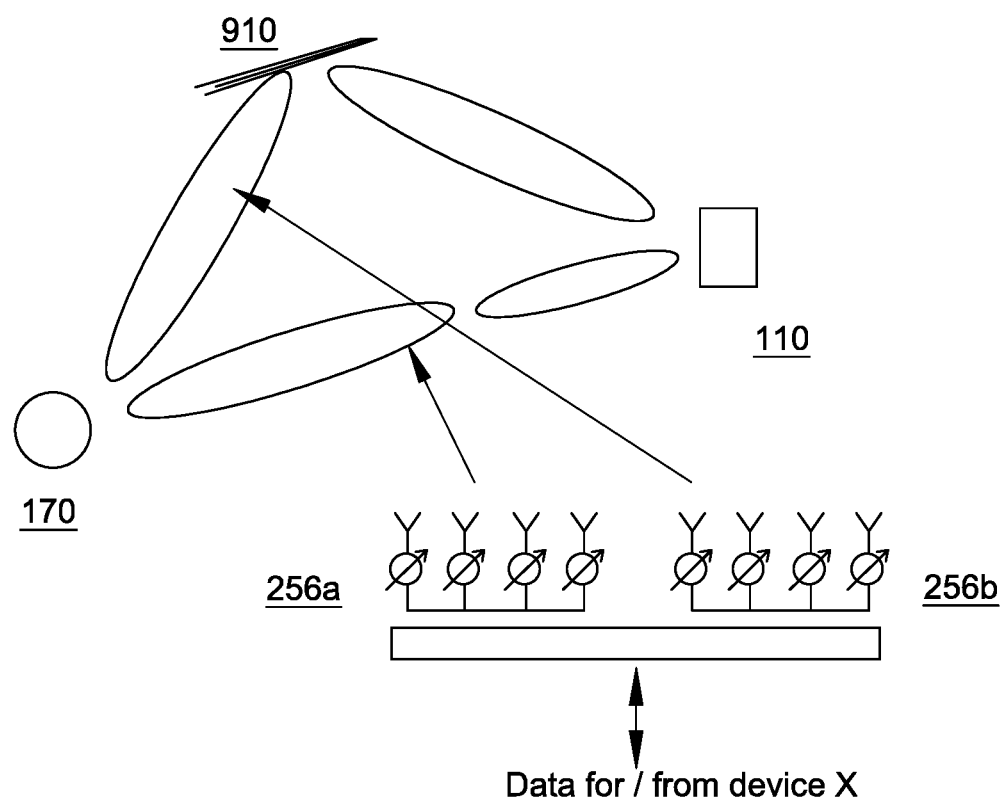
FIG. 22 illustrates the use of two simultaneous beam pairs by a base station for communicating with a single device, in accordance with some examples disclosed herein.

FIG. 22 illustrates another example in which two (or more) antenna arrays 256a, 256b may be used by the BS 170 to transmit two (or more) beams targeting the same ED 110. For example, a plurality of candidate beam pairs may be outputted by the machine learning system 630 (e.g., as discussed with respect to FIG. 14) and the BS 170 may select two (or more) beam pairs to use for communication with the ED 110, each selected beam pair being radiated by a respective antenna array 256a, 256b. This may enable multiple different beam pairs (in this example, including both LOS and NLOS beam pairs) to be established between the BS 170 and the single ED 110. The signals received via two or more beams may be combined at the receiver of the ED 110. Such redundancy may help to overcome the influence of deep fading in order to improve the received DL signal quality, for example.

Generally, information from the positional system 500 and association system 600 may enable more efficient use of the spatial dimension, for example to enable simultaneous multi-transmission and/or for higher throughput.

Information from the positional system 500 and the association system 600 may also help to coordinate ED-to-ED communications (e.g., vehicle-to-vehicle communications). In order to establish a wireless communication between two EDs, knowledge about the 3D coordinates of each ED may be useful. The current (and optionally predicted) coordinate information of each ED may be determined, as discussed above. This information may be provided to each ED, optionally together with other information useful for establishing ED-to-ED communications. The EDs may use this information to manage their own beams or other wireless communication parameters.

The integration of positional system and wireless system, as disclosed herein, may include not only association of coordinate information with wireless signals of EDs, but may also include association of environmental and/or geographic information and wireless radio channel-related information. For example, the association system 600 may (e.g., using machine learning) determine a correlation between the physical position of an ED and its wireless traffic usage. The association system 600 may identify unusual situations and generate notifications accordingly. The association system 600 may provide information that may be used to control the trajectories of EDs 110 (e.g. autonomous or semi-autonomous vehicles) based on detected current physical traffic. Such examples may help to manage network traffic (e.g., optimize resource usage) and/or help to manage physical traffic.

Coordinate information about the ED may also be provided to the ED itself. This may enable the ED to optimize its own beam management (e.g., based on the relative 3D position from the associated BS). The ED may also provide feedback to the BS indicating a quality of service (QoS) or quality of experience (QoE) and the associated beam management setup. An algorithm (e.g., machine learning algorithm) at the BS and/or the core network may use such information from multiple EDs to learn an appropriate beam management setup or other wireless communication parameter setup for an ED, given a 3D position of the ED.

In some examples, when a BS determines that an ED is decamping or should be handed over to a neighboring cell, the BS may transmit the current (and optionally predicted) 3D coordinates of the ED to the neighboring BS to help facilitate the handover procedure. The BS or neighboring BS may also transmit the BSs's own 3D positions to the ED, to enable the ED to optimize its own beam management and handover procedure.

In some examples, the coordinate information of an ED 110 (which may be reported by the ED 110 itself or by the BS or other network-side device, to the association system 600) may be sufficiently precise (e.g., having a precision on the order of ~10 cm) to enable the coordinate information to be used to directly associate a sensed object (sensed by the sensing system 400) with the unique ID of the ED 110, as registered in the wireless system 100. The signal-related information in a given environment at a specific position (which may be gathered and stored, for example in the form of a signal-related map as discussed above) can be used to help the BS 170 (or other network-side device) to manage the wireless transmissions for that ED 170.

In some examples, lower accuracy or lower precision coordinate information of an ED 110 (which may be calculated and reported by the ED 110 itself or by the BS 170 or other network-side device) can be provided to the association system 600. Such lower quality coordinate information may be not be sufficiently accurate or precise to enable the association system 600 to directly make the association between the coordinate information and a sensed object. However, such lower quality coordinate information may still help the association system 600, as supplementary information to the signal-related information reported from the wireless system 100.

Figure 23:
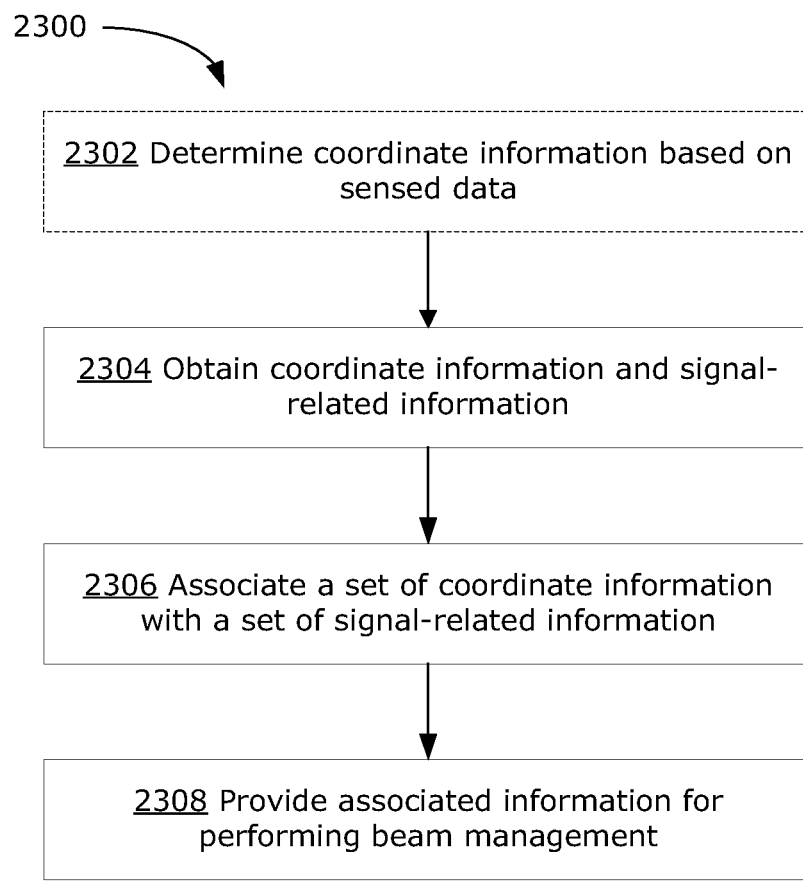
FIG. 23 is a flowchart of an example method for associating the coordinate information from the positional system with device identifiers registered in the wireless system.

FIG. 23 is a flowchart illustrating an example method 2300 that may be performed to implement one or more examples disclosed herein. For example, the method 2300 may be performed by the association system 600 (and possibly with the positional system 500) or a positional system 500 that includes an association system.

At 2302, coordinate information may be determined based on sensed data obtained from one or more sensors 402. 2302 may be performed by the association system 600, for example in examples where the positional system 500 is part of the association system 600. In other examples, the association system 600 may not performed 2302.

At 2304, coordinate information and signal-related information are obtained. For example, coordinate information may be obtained by performing 2302. In other examples, coordinate information may be obtained from a positional system 500 that is separate from the association system 600. Signal-related information may be obtained from the wireless system 100. In examples where the association system 600 is part of the wireless system 100 (e.g., integrated with the core network 130 and/or the BS 170, the signal-related information may be implicitly obtained).

At 2306, a given set of coordinate information (e.g., a vector containing 3D coordinates and 3D velocities for a given sensed object) is associated with a set of signal-related information (e.g., a set of measured channel conditions for a given UE-ID). This association may be performed using various suitable methods (including machine learning-based methods), such as in the examples discussed above. The coordinate information may include measured coordinate information (e.g., calculated using sensed data) and/or predicted coordinate information (e.g., predicted position, trajectory and/or velocity for one or more future time points). The associated information may be stored in a table locally at the association system 600 and/or remotely at a database.

At 2308, the associated information is provided for performing various beam management activities, as discussed above. The associated information may also be provided for machine learning purposes, as discussed above.

Figure 24:
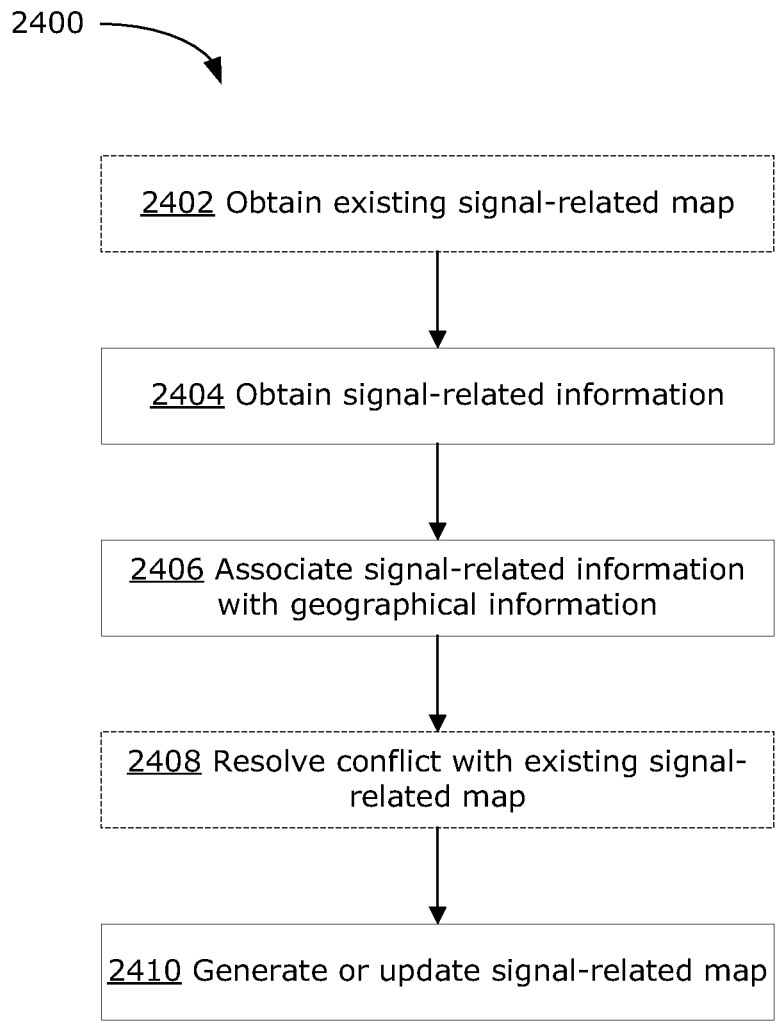
FIG. 24 is a flowchart of an example method for constructing a signal-related map to relate signal-related information to geographical information.

FIG. 24 is a flowchart to illustrate an example method 2400 for generating or updating a signal-related map. For example, the method 2400 may be performed by the association system 600 or the positional system 500 including an association system. In other examples, the method 2400 may be performed by another entity (e.g., a component of the core network 130).

Optionally, at 2402, an existing signal-related map may be obtained. For example, a signal-related map may have been previously generated and stored, and the method 2400 may be used to update information in the existing signal-related map. The existing signal-related map may be obtained by retrieving the stored map from a local memory of the association system 600, or may be obtained by the association system 600 accessing another database or storage where the signal-related map is stored, for example.

At 2404, signal-related information is obtained. Various methods may be used to obtain the signal-related information.

For example, signal-related information may be measured by conducting testing using a ED 110 or some other signal measure instrument at a position of interest and at a certain environment. The testing may be carried out in the wireless system 100, for example under commands from the core network 130. In some examples, the association system 600 may communicate with the wireless system 100 to request that testing be performed in order to obtain certain desired signal-related information. For example, if the association system 600 determines that there is no signal-related information at a certain geographical position in an existing signal-related map, or that the signal-related information at a certain geographical position is out-of-date (e.g., more than 1 hour old), the association system 600 may communicate a request to the wireless system 100 to obtain new signal-related information at that certain geographical position. In some examples, testing may be initiated by the wireless system 100 without a request from the association system 600. For example, the wireless system 100 may determine (e.g., using various tracking techniques) that an ED 110 has moved from a first geographical region into a second geographical region. The core network 130 may instruct a BS 170 in the second geographical region to request the ED 110 to perform testing, in order to obtain signal-related information for the second geographical region. Other techniques may be used to test or probe for up-to-date signal-related information in different geographical positions. The resulting signal-related information may then be provided to the association system 600.

In some examples, historical signal-related information may be obtained by in the association system 600. For example, previously received signal-related information (e.g., obtained during the method 2300 described above) may be associated with coordinate information of a sensed object with sufficiently high confidence (e.g., over 95% confidence). The historical signal-related information from that sensed object at that geographical coordinate may be obtained for generating or updating the signal-related map. Additionally or alternatively, newer (e.g., current) signal-related information may be obtained from that sensed object (e.g., where the sensed object is an ED 110, such as a wirelessly connected vehicle or a mobile device) together with coordinate information from that sensed object. In some examples, the sensed object may be a stationary ED 110 (e.g., an IoT device at a fixed position) with a known geographical position. The signal-related information may be obtained from that stationary ED 110 (via the wireless system 100) and readily related to the known geographical position.

In some examples, signal-related information may be measured in the field (e.g., during regular usage by a user) and reported by a tracked ED 110 to the wireless system 100. The geographical position of the tracked ED 110 may be determined via suitable tracking techniques. The signal-related information and the tracked position may both be reported by the wireless system 100 to the association system 600.

At 2406, the signal-related information obtained at 2404 is associated with geographical information (e.g., specific coordinate information). As mentioned above, the geographical information may be reported by the wireless system 100 to the association system 600. In cases where the geographical information is of sufficient quality (e.g., sufficiently precise and accurate coordinate information), the association system 600 may directly associate the signal-related information with the geographical information. In some examples, the association system 600 may already have the geographical information (e.g., in the case where the signal-related information is obtained from a stationary ED 110 at a known location), and the association system 600 may associate the signal-related information obtained from a stationary ED 110 with the known geographical information for that ED 110.

Optionally, at 2408, if there is a conflict between the obtained signal-related information and existing information in an existing signal-related map, conflict resolution may be performed in various ways. A conflict may be found if the signal-related information at a given geographical position is significantly different (e.g., more than 10% difference) from the recorded signal-related information at the given geographical position in the existing signal-related map. In some examples, conflict resolution may involve replacing the existing (older) signal-related information by the newly obtained signal-related information. In some examples, conflict resolution may involve combining existing signal-related information with newly obtained signal-related information to generate the updated signal-related information to be stored in the signal-related map (for example, an updated power measurement may be calculated by averaging the existing and newly obtained power measurement). Other conflict resolution techniques may be used. In examples where there is no existing signal-related map, or the existing signal-related map does not include signal-related information for that given geographical position, conflict resolution may not be necessary.

At 2410, the signal-related map is generated or the existing signal-related map is updated, using the signal-related information associated with geographical information (from step 2406). The signal-related map may then be stored (e.g., locally at the association system 600 or at another location accessible by the association system 600). The signal-related map may also be provided to or accessible by the wireless system 100, for example to assist the wireless system 100 to perform wireless communications.

Figure 25:
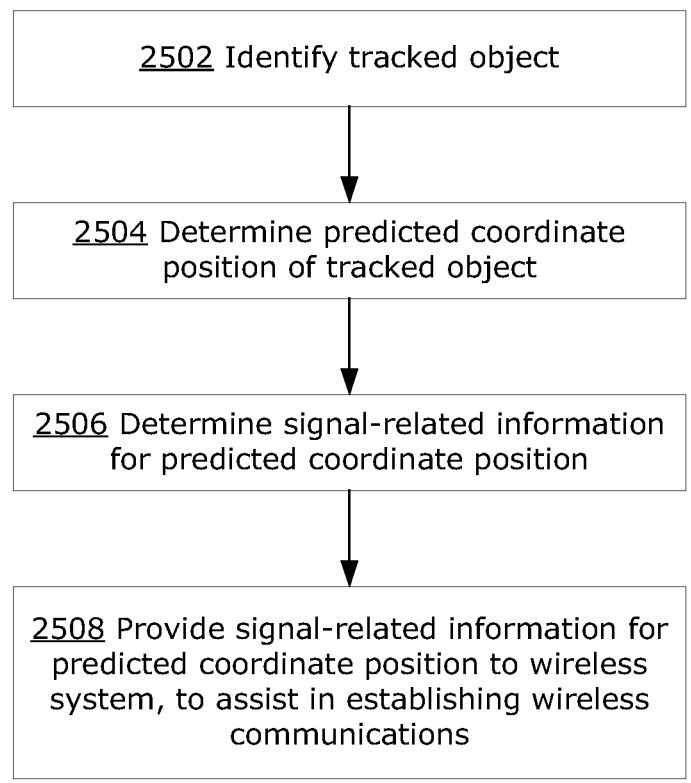
FIG. 25 is a flowchart of an example method for using the signal-related map to assist in wireless communication.

FIG. 25 is a flowchart illustrating an example method 2500 for using a signal-related map (e.g., as generated or updated according to the method 2400 described above) to assist in wireless communication. The method 2500 may be performed by the positional system 500.

At 2502, a tracked object is identified. The tracked objected may be any sensed object sensed by the sensing system 400, and tracked by the wireless system 100. This tracked object can be identified through a device ID registered at the wireless system 100 and provided to the positional system 500 (e.g., in response to a request from the positional system 500). The wireless system 100 may also provide other information (such as a series of timings of interest, or wireless communication parameters of interest) to the positional system 500, regarding this tracked object. A "timing of interest" refers to the time required to communicate with the sensed object. After receiving the timing of interest, this information may be used in the following step 2504 to predict the coordinate position of a sensed ED. Wireless communication parameters of interest may include parameters that are used to select the precision of the predicted coordinate. For example, if very narrow beamforming is adopted in communications with the ED, higher precision is needed; if omnidirectional communication is used, lower precision of coordinate information may be enough to support the communications.

At 2504, the positional system 500 predicts the coordinate position of the tracked object at a future time (e.g., one or more of the timings of interest provided by the wireless system 100). This prediction may be performed using information from the sensing system 400 (e.g., information from sensors 402 may be used to determine a current velocity and/or heading of the tracked object, and thus determine a predicted coordinate position by assuming the velocity and/or heading will be maintained). The predicted coordinate position may be in the form of a vector containing at least the predicted 3D position, and optionally also containing the predicted or current 3D velocity information and/or the future timing of interest.

The predicted coordinate position may be provided (e.g., in a query or a request) to the system (e.g., the association system 600) that is capable of accessing the signal-related map. In some examples, instead of the positional system 500 providing the predicted coordinate position to another system having access to the signal-related map, the positional system 500 may itself have access to the signal-related map or may be provided a copy of the signal-related map (or a portion of the signal-related map).

At 2506, signal-related information corresponding to the predicted coordinate position is determined. For example, the predicted coordinate position may be used to look up the signal-related information in the signal-related map. This may be performed by the association system 600 (or other system) after receiving the predicted coordinate information from the positional system 500. The positional system 500 may determine the signal-related information for the predicted coordinate position by sending a query or request to the association system 600 (or other system), including the predicted coordinate information, and receiving the response from the association system 600 (or other system) including the signal-related information for the predicted coordinate position. In some examples, the signal-related information for the predicted coordinate position may be determined by the positional system 500 itself accessing or receiving a copy of the signal-related map (or a portion thereof) and looking up the desired signal-related information.

In some examples, the predicted coordinate position is already recorded with corresponding signal-related information in the signal-related map. The signal-related information for that predicted coordinate position can thus be directly determined from the signal-related map and provided to the wireless system 100. In some examples, the predicted coordinate position is not recorded with corresponding signal-related information in the signal-related map, or the predicted coordinate position is not covered by the signal-related map. In such cases, the signal-related information for the predicted coordinate position may be calculated or estimated. For example, interpolation or extrapolation of signal-related information that is recorded in the signal-related map for the adjacent known positions may be performed.

In some examples, the signal-related information may not be estimated or calculated with sufficiently high confidence, in which case no prediction may be made. The wireless system 100 may be informed that signal-related information is not available for the predicted coordinate position. The positional system 500 may also request that the wireless system 100 obtain signal-related information (at some future time) for the predicted coordinate position (e.g., using any suitable methods, as discussed above).

At 2508, the signal-related information (whether directly looked up in the signal-related map or estimated) is provided to the wireless system 100. The signal-related information may be used by the wireless system 100 to help in the setup of wireless communications between a BS 170 and an ED 110 or between EDs 110 (e.g., where the ED 110 is the tracked object identified at 2502).

In various examples, the present disclosure describes the use of a positional system in cooperation with the wireless communication system. The positional system uses information gathered from sensors and generates coordinate information, which may aid the wireless system. For example, the positional system can provide information to help the wireless communication system to improve functions such as beam management, resource manage and others. The positional system may also be used with the wireless system for other functions. For example, the positional system may be configured to monitor for certain events (e.g., occurrence of a fire) and, such the event is detected, transmit the relevant sensed data and/or notification to a target receiver through the wireless system. Transmission of such data/notification via the wireless system may have little time delay. In some examples, the positional system may also be configured to process various requests from a third party.

The cooperation between the positional system and the wireless system can be difficult to facilitate, particularly the problem of how to relate sensed data in the positional system with wireless information in the wireless system. In various examples, the present disclosure descries different methods for determining an association between a sensed object (from the positional system) and an ED ID (used in the wireless system). For some type of EDs, this association may be determined based on coordinate information captured or calculated by the EDs or the BS (or other network-side device). For example, a GPS module inside the EDs may be used to capture the coordinate information or various position calculation methods (e.g., using time of arrival (ToA)) may be used to calculate the coordinate information. For some type of EDs, this association may be determined based on identifying information that can be sensed/detected by the positional system itself. For example, for a vehicle, the license plate number may be captured and detected by the positional system, and the license plate number may indicate the ED ID. For other types of EDs, this association may tend to be more difficult. In examples described herein, properties of wireless beam forming technology are used to make this association. Such association is necessary for the wireless system to benefit from the positional system (e.g., for beam management).

In various examples, the present disclosure describes a positional system that provides information which may be used to determine positioning of an ED in a wireless network. In some examples, the information from the positional system may be used to supplement positioning calculations performed by existing techniques in a wireless network.

The examples described herein may enable more accurate and precise positioning of an ED (particularly when the ED is moving quickly or irregularly), with lower signal overhead, lower spectrum utilization and/or lower ED processing overhead, compared to conventional positioning techniques.

In various examples, the present disclosure describes examples of machine learning where a neural network is used. It should be understood that other types of machine learning may be suitable. It should also be understood that classical (i.e., non-machine learning-based) approaches may be substituted, such as where the data is less complex.

As discussed above, a machine learning system may be trained to output various predicted information using information from the positional system, association system and/or wireless system. It should be understood that information from other sources (e.g., a reference database or other sensor system, such as a GPS tracking system) may also be used as input to the machine learning system.

In an example 1, the present disclosure describes a method comprising: obtaining a set of coordinate information representing a spatial location of an electronic device (ED); obtaining a set of signal-related information related to wireless signaling from the ED; generating a set of associated information for associating the set of coordinate information with the set of signal-related information; and providing the set of associated information for performing beam management.

In an example 2, the present disclosure describes the method of example 1, further comprising: obtaining one or more sets of sensed data from one or more respective sensors, the sensed data capturing spatial information about the ED; and determining the set of coordinate information using the sensed data.

In an example 3, the present disclosure describes the method of example 1 or 2 wherein the set of coordinate information includes one or both of: measured coordinate information representing an actual spatial location of the ED; or predicted coordinate information representing a predicted spatial location of the ED.

In an example 4, the present disclosure describes the method of example 3 wherein the predicted coordinate information is generated using machine learning.

In an example 5, the present disclosure describes the method of any one of examples 1 to 4 wherein the signal-related information includes one or more of: a UE-ID of the ED; a channel condition measured by the ED; a transmitter beam angle; a receiver beam angle; or a beam power.

In an example 6, the present disclosure describes the method of any one of examples 1 to 5 further comprising: obtaining a set of environmental information representing an environment of the ED; and wherein generating the associated information includes associating the set of environmental information with the set of coordinate information and the set of signal-related information.

In an example 7, the present disclosure describes the method of any one of examples 1 to 6 further comprising: using the set of associated information to train a machine learning system to predict: a channel condition at least partly on the basis of coordinate information; or a suitable beam pair at least partly on the basis of coordinate information; and using the trained machine learning system to output candidate parameters for beam management.

In an example 8, the present disclosure describes the method of any one of examples 1 to 7 further comprising: using the set of associated information for multi-user multiple-input multiple-output (MU-MIMO) communications.

In an example 9, the present disclosure describes a system comprising: a memory storing machine-executable instructions; and a processing unit coupled to the memory, the processing unit configured to execute the instructions to perform the method of any one of examples 1 to 8.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. The machine-executable instructions may be in the form of code sequences, configuration information, or other data, which, when executed, cause a machine (e.g., a processor or other processing device) to perform steps in a method according to examples of the present disclosure.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method comprising:
   obtaining, from a sensing system, a set of coordinate information representing spatial location information and 3-dimentional (3D) velocity information of objects in a physical region, the spatial location information of the objects including 3D physical positions of the objects, the sensing system being network-side equipment;
   obtaining a set of signal-related information related to wireless signaling between electronic devices (EDs) within a region covered by a wireless network and the wireless network, wherein the sensing system is independent from both the wireless network and the EDs, and the sensing system generates the 3D physical positions of the objects from sensed data including video-like data independently from any communications between the wireless network and the EDs;
   associating an ED of the EDs with an object of the objects based on a 3D spatial change of the object and a wireless communication signaling change of the ED, to generate;
   a set of associated information between coordinate information of the object and signal-related information of the ED, the 3D spatial change of the object being based on the set of coordinate information from the sensing system, and the wireless communication signaling change of the ED being based on the set of signal-related information from the wireless network; and
   providing the set of associated information for performing wireless network management including at least one of beam management, resource allocation, or massive multiple-input and multiple-output (M-MIMO) pairing.

2. The method of claim 1, wherein generating the set of associated information comprises:
   obtaining a signal-related map associated with the set of signal-related information; and
   generating an updated signal-related map based on the obtained signal-related map and the set of coordinate information obtained from the sensing system.

3. The method of claim 2, wherein generating the set of associated information further comprises:
   associating the set of coordinate information obtained from the sensing system with the obtained set of signal-related information.

4. The method of claim 2, wherein the obtained signal-related map is determined based on an ED being stationary.

5. The method of claim 2, wherein the updated signal-related map is generated based on an ED being a non-stationary ED.

6. The method of claim 5, wherein the updated signal-related map comprises a predicted coordinate position of the non-stationary ED.

7. The method of claim 1, wherein the set of signal-related information includes one or more of:
   a UE-ID of the ED;
   a channel condition measured by the ED;
   a transmitter beam angle;
   a receiver beam angle; or
   a beam power.

8. A system comprising:
   a memory storing machine-executable instructions; and
   a processing unit coupled to the memory, the processing unit configured to execute the machine-executable instructions to cause the system to:
      obtain, from a sensing system, a set of coordinate information representing a spatial location information and 3-dimentional (3D) velocity information of objects in a physical region, the spatial location information of the objects including 3D physical positions of the objects, the sensing system being network-side equipment;
      obtain a set of signal-related information related to wireless signaling between electronic devices (EDs) within a region covered by a wireless network and the wireless network, wherein the sensing system is independent from both the wireless network and the EDs, and the sensing system generates the 3D physical positions of the objects from sensed data including video-like data independently from any communications between the wireless network and the EDs;
      associate an ED of the EDs with an object of the objects based on a 3D spatial change of the object and a wireless communication signaling change of the ED, to generate a set of associated information between coordinate information of the object and signal-related information of the ED, the 3D spatial change of the object being based on the set of coordinate information from the sensing system, and the wireless communication signaling change of the ED being based on the set of signal-related information from the wireless network; and
      provide the set of associated information for performing wireless network management including at least one of beam management, resource allocation, or massive multiple-input and multiple-output (M-MIMO) pairing.

9. The system of claim 8, wherein the processing unit is further configured to execute the machine-executable instructions to generate the set of associated information by:
   obtaining a signal-related map associated with the set of signal-related information; and
   generating an updated signal-related map based on the obtained signal-related map and the set of coordinate information obtained from the sensing system.

10. The system of claim 9, wherein the processing unit is further configured to execute the machine-executable instructions to generate the set of associated information by further:
    associating the set of coordinate information obtained from the sensing system with the obtained set of signal-related information.

11. The system of claim 9, wherein the obtained signal-related map is determined based on an ED being stationary.

12. The system of claim 9, wherein the updated signal-related map is generated based on an ED being a non-stationary ED.

13. The system of claim 12, wherein the updated signal-related map comprises a predicted coordinate position of the non-stationary ED.

14. The system of claim 8, wherein the set of signal-related information includes one or more of:
- a UE-ID of the ED;
- a channel condition measured by the ED;
- a transmitter beam angle;
- a receiver beam angle; or
- a beam power.

15. A non-transitory computer-readable medium having encoded thereon machine-executable instructions, wherein the machine-executable instructions, when executed by a processing unit of a system, cause the system to:
- obtain, from a sensing system, a set of coordinate information representing spatial location information and 3-dimentional (3D) velocity information of objects in a physical region, the spatial location information of the objects including 3D physical positions of the of the objects, the sensing system being network-side equipment;
- obtain a set of signal-related information related to wireless signaling between electronic devices (EDs) within a region covered by a wireless network and the wireless network, wherein the sensing system is independent from both the wireless network and the EDs, and the sensing system generates the 3D physical positions of the objects from sensed data including video-like data independently from any communications between the wireless network and the EDs;
- associate an ED of the EDs with an object of the objects based on a 3D spatial change of the object and a wireless communication signaling change of the ED, to generate a set of associated information between coordinate information of the object and signal-related information of the ED, the 3D spatial change of the object being based on the set of coordinate information from the sensing system, and the wireless communication signaling change of the ED being based on the set of signal-related information from the wireless network; and
- provide the set of associated information for performing wireless network management including at least one of beam management, resource allocation, or massive multiple-input and multiple-output (M-MIMO) pairing.

16. The non-transitory computer-readable medium of claim 15, wherein the machine-executable instructions further cause the system to generate the set of associated information by:
- obtaining a signal-related map associated with the set of signal-related information; and
- generating an updated signal-related map based on the obtained signal-related map and the set of coordinate information obtained from the sensing system.

17. The non-transitory computer-readable medium of claim 16, wherein the machine-executable instructions further cause the system to generate the set of associated information by further:
- associating the set of coordinate information obtained from the sensing system with the obtained set of signal-related information.

18. The non-transitory computer-readable medium of claim 16, wherein the obtained signal-related map is determined based on an ED being stationary.

19. The non-transitory computer-readable medium of claim 16, wherein the updated signal-related map is generated based on an ED being a non-stationary ED.

20. The non-transitory computer-readable medium of claim 19, wherein the updated signal-related map comprises a predicted coordinate position of the non-stationary ED.

21. The non-transitory computer-readable medium of claim 20, wherein the set of signal-related information includes one or more of:
- a UE-ID of the ED;
- a channel condition measured by the ED;
- a transmitter beam angle;
- a receiver beam angle; or
- a beam power.

* * * * *